(12) United States Patent
Wang et al.

(10) Patent No.: US 12,137,412 B2
(45) Date of Patent: Nov. 5, 2024

(54) POWER CONSUMPTION MODEL FOR ENERGY HARVESTING NODES

(71) Applicant: QUALCOMM Incorporated, San Diego, CA (US)

(72) Inventors: Xiaojie Wang, Hillsborough, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/934,902

(22) Filed: Sep. 23, 2022

(65) Prior Publication Data

US 2024/0107447 A1    Mar. 28, 2024

(51) Int. Cl.
| | |
|---|---|
| *H02J 50/80* | (2016.01) |
| *H02J 50/10* | (2016.01) |
| *H04B 7/26* | (2006.01) |
| *H04W 52/02* | (2009.01) |

(52) U.S. Cl.
CPC ......... *H04W 52/0212* (2013.01); *H02J 50/10* (2016.02); *H02J 50/80* (2016.02); *H04B 7/26* (2013.01)

(58) Field of Classification Search
CPC ...... H04B 7/22; H04B 7/0413; H04B 5/0062; H04B 1/401; H04B 1/0458; H04B 5/0031; H04B 1/1607; H04B 1/3833; H04B 17/318; H04W 4/80; H04W 4/029; H04W 4/70; H04W 4/38; H04W 52/0229; H04W 84/12; H04W 88/06; H04W 12/06; H04W 4/025; H04L 67/12; H04L 9/0668; H04L 9/085; H04L 9/14; H04L 2209/805; H04L 9/088; H04L 9/32; H04L 9/0861; H04L 67/125

USPC ....................................................... 375/219

See application file for complete search history.

(56) References Cited

U.S. PATENT DOCUMENTS

| | | | |
|---|---|---|---|
| 11,089,605 B2 * | 8/2021 | Campbell | H04W 72/56 |
| 2011/0181399 A1 * | 7/2011 | Pollack | G06K 19/0717 340/10.33 |
| 2014/0011543 A1 | 1/2014 | Li et al. | |
| 2018/0205144 A1 * | 7/2018 | Huang | H02J 50/90 |
| 2020/0083757 A1 | 3/2020 | Altinel et al. | |
| 2022/0006333 A1 * | 1/2022 | Yeo | H02J 50/80 |
| 2022/0225402 A1 * | 7/2022 | Elkotby | H04W 74/004 |
| 2022/0407592 A1 * | 12/2022 | Xu | H04W 72/0473 |
| 2023/0051410 A1 * | 2/2023 | Myers | G08B 5/36 |
| 2023/0097295 A1 * | 3/2023 | Shao | H04B 5/0031 375/308 |
| 2023/0163630 A1 * | 5/2023 | Savanth | H02J 50/001 307/149 |

OTHER PUBLICATIONS

International Search Report and Written Opinion—PCT/US2023/032431—ISA/EPO—Jan. 9, 2024.

* cited by examiner

*Primary Examiner* — Eva Y Puente
(74) *Attorney, Agent, or Firm* — Procopio, Cory, Hargreaves & Savitch LLP/Qualcomm

(57) ABSTRACT

A method of wireless communication at a device that supports energy harvesting is disclosed herein. The method includes obtaining, via at least one energy harvesting operation, energy from a wireless transmission. The method further includes transmitting, for a network node, an indication of power consumption of the device for at least one of wireless communications or sensing at the device.

29 Claims, 21 Drawing Sheets

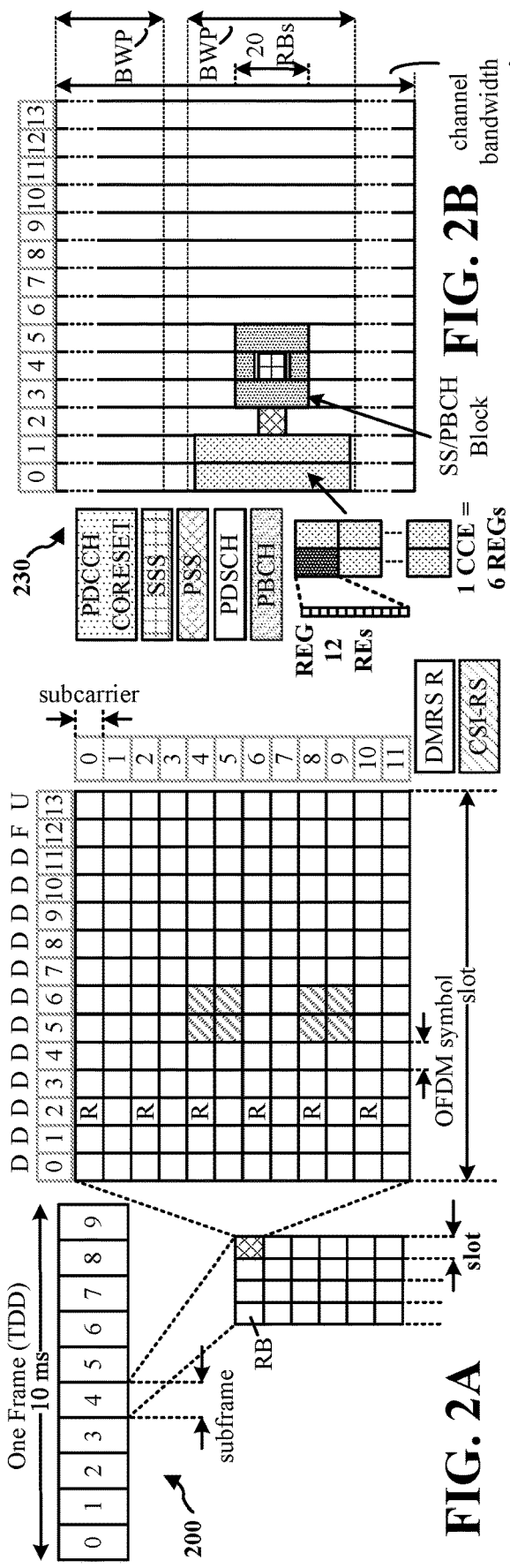
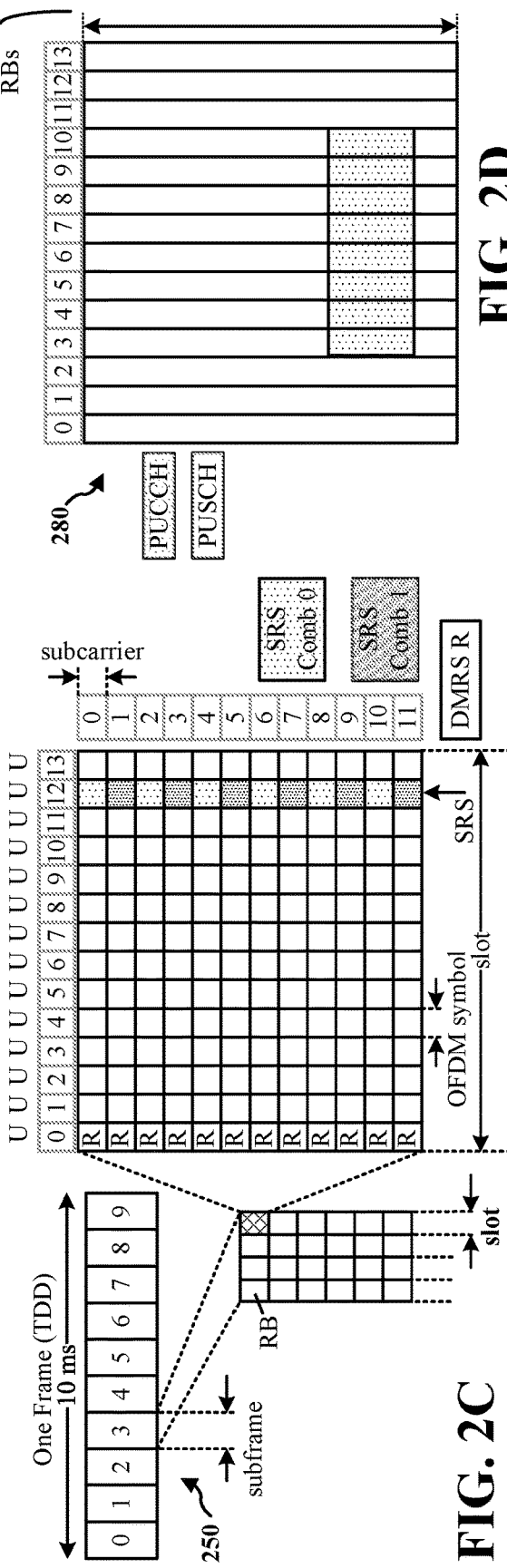
FIG. 2A
FIG. 2B
FIG. 2C
FIG. 2D

POWER CONSUMPTION MODEL FOR ENERGY HARVESTING NODES

TECHNICAL FIELD

The present disclosure relates generally to communication systems, and more particularly, to energy harvesting (EH) nodes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a device that supports energy harvesting are provided. The apparatus includes a memory and at least processor coupled to the memory and, based at least in part on information stored in the memory, the at least one processor is configured to obtain, via at least one energy harvesting operation, energy from a wireless transmission; and transmit, for a network node, an indication of power consumption of the device for at least one of wireless communications or sensing at the device.

In an aspect of the disclosure, a method, a computer-readable medium, and an apparatus are provided for wireless communication at a network node are provided. The apparatus includes a memory and at least processor coupled to the memory and, based at least in part on information stored in the memory, the at least one processor is configured to receive an indication of power consumption of a device that supports energy harvesting for at least one of wireless communications or sensing based on energy harvested by at least one energy harvesting operation of the device; and transmit, based on the indication of the power consumption, signaling for the device associated with performing at least one of the wireless communications or the sensing.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
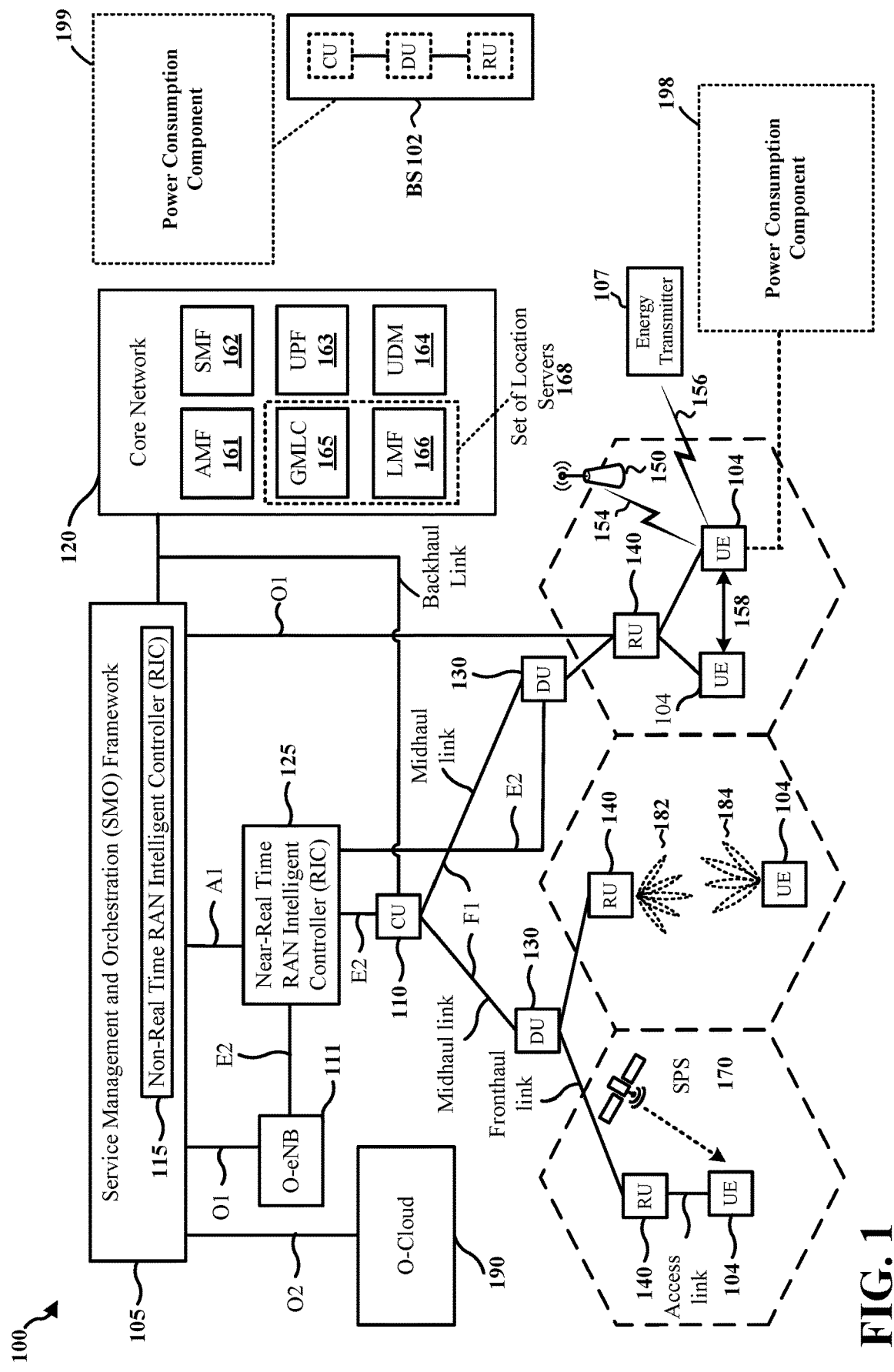
FIG. 1 is a diagram illustrating an example of a wireless communications system and an access network.

A device (e.g., a UE) may include a EH harvesting modality (e.g., a backscatter radio). In an example, the device may receive an energy transfer signal from a network node. The device may harvest energy from the energy transfer signal to perform an operation during a communication phase with the network node or perform sensing via sensors of the device. If the device lacks sufficient energy for the communication phase with the network node, the device may skip the communication phase. Similarly, if the device lacks sufficient energy to perform sensing, the device may not perform the sensing. Various technologies pertaining to a power consumption model for an energy harvesting device are disclosed herein. In an example, a device that supports energy harvesting obtains, via at least one energy harvesting operation, energy from a wireless transmission. The device transmits, for a network node, an indication of power consumption of the device for at least one of wireless communications or sensing at the device. The indication of the power consumption of the device may enable the network node to manage an energy transfer and duty cycle of a communication phase of the device in an energy efficient manner such that communications are not skipped due to the device lacking sufficient energy and/or such that the device does not skip sensing due to the device lacking sufficient energy.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (e.g., a gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz).

Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher frequency operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

One or more devices may be an energy transmitter 107 that transmits an energy signal 156 to the UE 104. As an example, the UE 104 may be an energy receiver or a passive device with a power harvesting circuit that may harvest radio frequency (RF) energy from the energy signal 156 received from the energy transmitter 107. At least one dedicated frequency band or sub-channel may be configured for the energy transmitter 107 to transmit the energy signal 156 and the UE 104 to receive the energy signal 156 and harvest the RF energy from the received energy signal 156. The energy transmitter 107 may be a network device, a UE, a reader, or another type of device that supports the transmission of an energy signal that can be used to harvest energy by a receiving device, such as a UE 104.

Referring again to FIG. 1, in certain aspects, the UE 104 may include a power consumption component 198 that is configured to obtain, via at least one energy harvesting operation, energy from a wireless transmission and transmit, for a network node, an indication of power consumption of the device for at least one of wireless communications or sensing at the device. In certain aspects, the base station 102 may include a power consumption component 199 that is configured to receive an indication of power consumption of a device that supports energy harvesting for at least one of wireless communications or sensing based on energy harvested by at least one energy harvesting operation of the device and transmit, based on the indication of the power consumption, signaling for the device associated with performing at least one of the wireless communications or the sensing. Although the following description may be focused on energy harvesting nodes that utilize backscatter radio to harvest energy, the concepts described herein may be applicable to other types of energy harvesting nodes, such as energy harvesting nodes that harvest energy from solar power sources, wind power sources, hydroelectric power sources, inductive coupling, etc. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
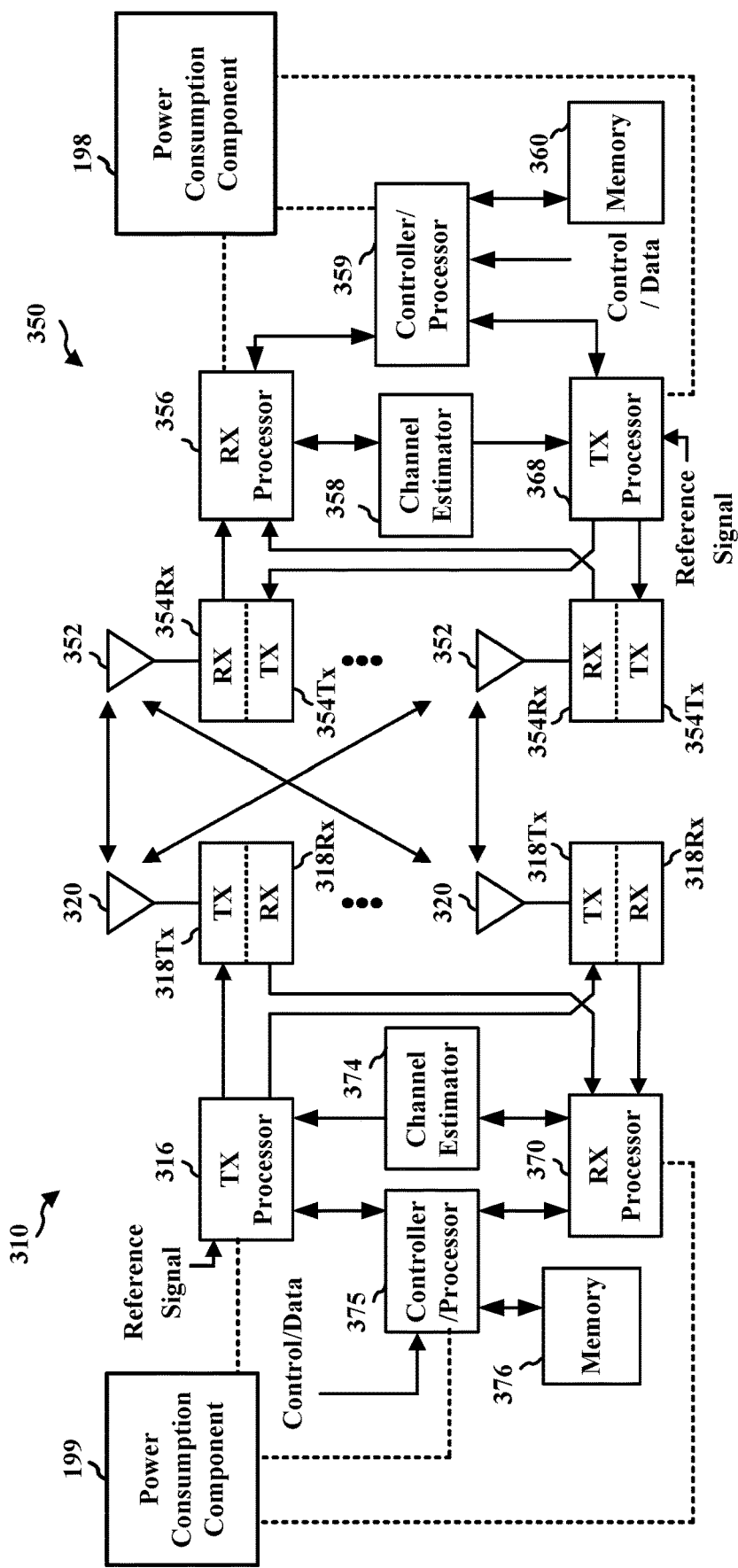
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the power consumption component 198 of FIG. 1.

At least one of the TX processor 316, the RX processor 370, and the controller/processor 375 may be configured to perform aspects in connection with the power consumption component 199 of FIG. 1.

In some aspects, a wireless communication system may include one or more devices that harvest or acquire energy from a wireless signal and use the harvested energy for wireless communication, sensing, or other operations of the device.

Figure 4:
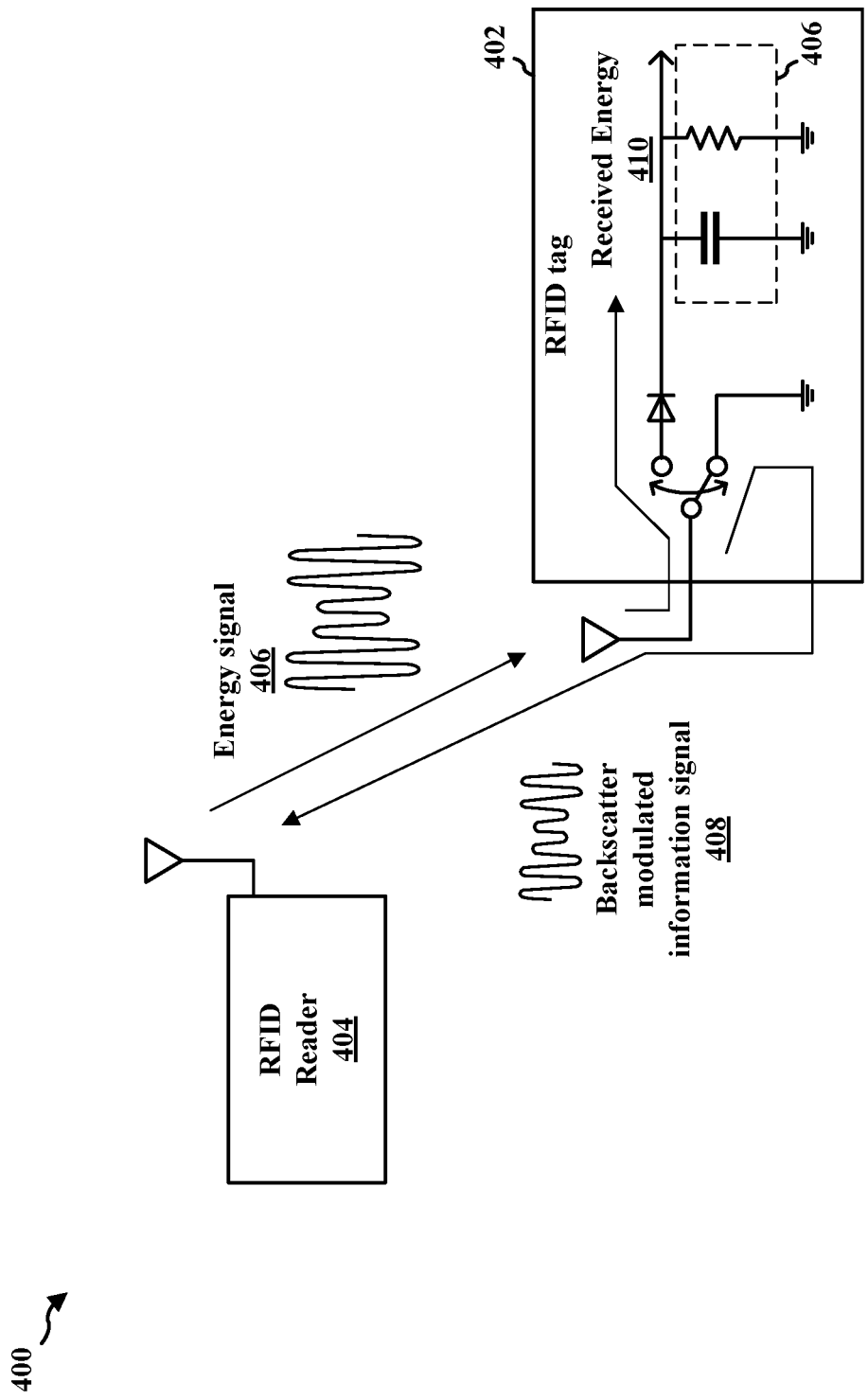
FIG. 4 illustrates a diagram of an example radio frequency identification (RFID) tag that receives an energy transfer signal from an RFID reader, in accordance with various aspects of the present disclosure.

FIG. 4 illustrates a diagram 400 of an RFID tag 402 that receives an energy transfer signal 406 from an RFID reader 404. Such an RFID tag 402 is one example of an energy receiver that may obtain energy from an energy transfer signal (or an energy signal) from an energy transmitter (e.g., the RFID reader 404). An energy transfer signal 406 may be used for various industrial IoT (IIoT) applications. For example, RFID technology may be used for inventory/asset management both inside and outside of warehouses, network sensors in factories, logistics devices, manufacturing settings, agricultural applications, smart homes, etc. RFID technology may also be deployed in association with cellular infrastructure for wireless applications. RFID devices may include a transponder (e.g., the RFID tag 402) that emits an information-bearing signal, such as a backscattered modulated information signal 408, upon receiving a signal from the RFID reader 404. That is, the RFID reader 404 may transmit the energy transfer signal 406 as well as an information signal to a passive RFID microchip (e.g., RFID tag 402) that operates without a battery source.

The RFID tag 402 may be configured to operate without the battery source at a low operational expenditure (OPEX), low maintenance cost, and/or increased lifecycle. Other types of RFID tags may include battery sources. For example, semi-passive RFID devices and active RFID devices may have a battery source, but may also be associated with a higher cost. If the RFID reader 404 is able to provide enough received energy 410 to the RFID tag 402, the RFID tag 402 may harvest the received energy 410 to perform an operation during communication occasions or may harvest the received energy 410 to charge an associated battery. Passive RFID tags may harvest the received energy 410 over-the-air in order to power Tx/Rx circuitry at the RFID tag 402. The energy transfer signal 406 transmitted to the RFID tag 402 may trigger the backscattered modulated information signal 408 from the RFID tag 402. The RFID tag 402 may absorb or reflect signals from the RFID reader 404 based on the information to be communicated between the RFID tag 402 and the RFID reader 404. The RFID tag 402 may include a decreased number of active RF components (e.g., no active RF component) in some cases. By increasing a coverage area of the energy transfer signal 406, the RFID reader 404 and the RFID tag 402 may communicate at longer physical distances.

Wireless communication techniques associated with eMBB, URLLC, machine-type communication (MTC), etc., may be supported for passive IoT devices. Passive IoT devices are another example of an energy receiving device, such as 405 in FIG. 4. In examples, the RFID reader 404 may correspond to a base station or an entity at a base station, and the RFID tag 402 may correspond to a UE or be in communication with the UE. However, some wireless communication techniques may not support certain types of widespread RFID technology, such as passive IoT devices used for asset management, logistics, warehousing, and manufacturing, etc. Among other examples, passive IoT devices may include timing devices such as clocks, video devices, household tools, construction tools, lighting systems, etc.

In some aspects, the wireless communication techniques may support wireless energy transmission (WET) and/or wireless information transmission (WIT) to incorporate passive IoT devices into wireless networks. Using a cellular infrastructure, a base station/network entity may operate as the RFID reader 404 that transmits the energy transfer signal 406 to the RFID tag 402 for communicating with the passive IoT devices via RFID technology. The base station/network entity may provide energy to the passive IoT devices via the energy transfer signal 406 (e.g., which may correspond to 412a or 414) and may be configured to read/write information stored at the passive IoT devices. Information-bearing signals may be reflected from the passive IoT devices to the base station/network entity, which may read the reflected signal. For instance, the base station/network entity may decode information included in the information-bearing signals (e.g., backscattered modulated information signal 408) received from the passive IoT devices (e.g., RFID tag 402).

Figure 5:
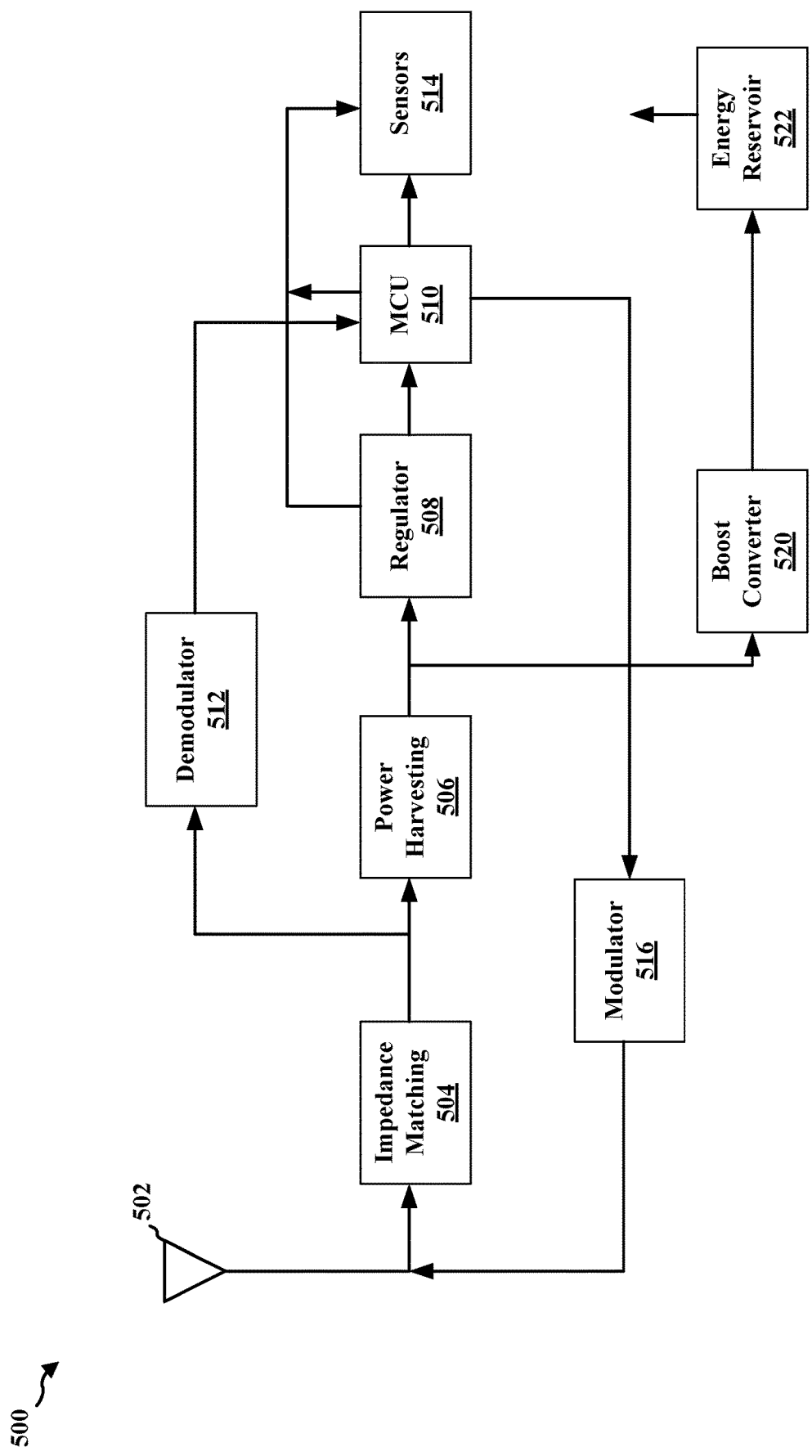
FIG. 5 is a diagram of an example power harvesting circuit, in accordance with various aspects of the present disclosure.

FIG. 5 is a diagram of a power harvesting circuit 500. In examples, the power harvesting circuit may be included at an RFID tag and may include few or no active components. The power harvesting circuit may be configured to operate at low power during an energy transfer procedure for RF power harvesting. The energy transfer signal may be received by an antenna 502 and communicated to an impedance matching component 504. The impedance matching component 504 may be tuned to an impedance of the antenna 502, so that an input to a power harvesting component 506 may be based on an increased power from the impedance matching component. An output of the impedance matching component 504 may also be demodulated by a demodulator 512 and provided to a microcontroller unit (MCU) 510.

A non-linearity of the power harvesting component 506 may be generated at an output of the power harvesting component 506 based on characteristics of a diode associated with the power harvesting component 506. For instance, the power harvesting component 506 may include a diode that has to receive a minimum voltage/power from the antenna 502 and impedance matching component 504 in order to activate the diode. The minimum voltage/power that is input to the power harvesting component 506 to activate the diode may be larger than a power associated with an information signal. For example, the input power to the power harvesting component 506 may be larger than −20 dBm, although −10 dBM may be a minimum power to activate the diode/power harvesting component 506 in some cases. The power harvesting component 506 may be more efficient at lower frequencies at converting the energy transfer signal to power based on a capacitance and/or a resistance of the diode at the power harvesting component 506. In contrast to energy transfer signals, bits of an information signal may be decoded at power inputs as low as −100 dBm to −80 dBm. A regulator 508 may receive an output of the power harvesting component 506. The regulator 508 may regulate the non-linearity of the power harvesting component 506 prior to providing the output of the power harvesting component 506 to the MCU 510. The MCU 510 may be configured to control sensors 514 in communication with the MCU 510 based on the harvested power and/or output a signal to a modulator 516 that modulates the output signal as feedback for antenna 502 and/or the impedance matching component 504.

The power harvesting circuit may include a boost converter 520 to receive the output of the power harvesting component 506. The boost converter may step up (or boost) the voltage of the output of the power harvesting component. The output of the boost converter 520 with the boosted voltage may be supplied to an energy reservoir 522. The energy reservoir 522 may receive the boosted voltage and store the energy harvested by the power harvesting component 506. The energy reservoir 522 may provide the stored power to other components that may need to turn on without the output of the power harvesting component 506. For example, the power harvesting circuit may determine that the energy transmitter that the energy signal received from the energy transmitter fails to meet a threshold value. If the energy density of the receive energy signal is lower than a turn-on voltage, the energy receiver may use the power stored in the energy reservoir to transmit an indication to the energy transmitter that the energy signal received from the energy transmitter failed to meet the threshold value.

In some aspects, the passive IoT devices may be incorporated into the wireless networks, and ambient RF signal may not provide sufficient power density to send the energy signal having the power density greater than or equal to a threshold value to activate (or turn on) the power harvesting circuit. In one example, the power density of the ambient RF signals (e.g., digital television signal (DTV), global system for mobile communication (GSM), 3G, or Wifi) may be lower than 10 nW/cm$^2$. Here, the power level may vary over time and depends on the locations.

The wireless communication techniques may support wireless energy transmission (WET) and/or wireless information transmission (WIT) to incorporate passive IoT devices into wireless networks. That is, a dedicated frequency bands may be configured for wireless energy transmission to PIoT applications. The frequency band associated with the WET may be reserved for at least one of the WET, the WIT or the WET+WIT. The dedicated frequency band may provide the energy coverage for the pervasive, or perpetual wireless-powered IoT devices.

Figure 6:
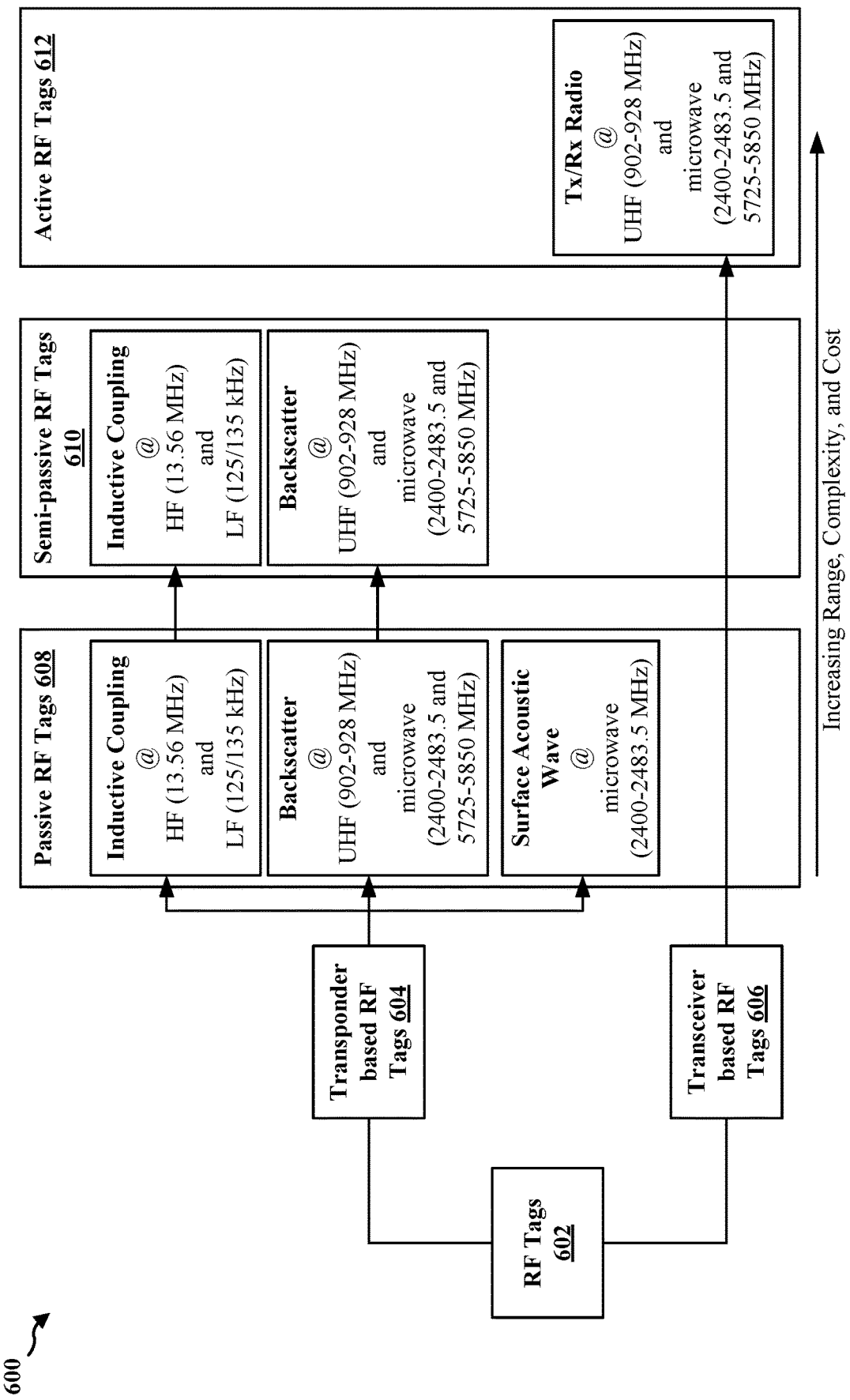
FIG. 6 is a diagram illustrating example aspects of radio frequency (RF) tags.

FIG. 6 is a diagram 600 illustrating example aspects of RF tags 602. The RF tags 602 may be categorized into transponder based RF tags 604 and transceiver based RF tags 606. The transponder based RF tags 604 may include transponders. A transponder may refer to communication hardware that includes passive RF components (i.e., without consuming power for transmitting a communication signal); however, power may be consumed for controlling the communication hardware for transmitting different types of signals. In an example, a transponder may be a back-scatter based transponder in which power is consumed for controlling transmission of zero bits and one bits while actual transmission does not consume power. The transceiver based RF tags 606 may include transceivers. A transceiver may refer to communication hardware that includes active RF components that consume power for transmitting communication signals. The transponder based RF tags 604 may include passive RF tags 608 and semi-passive RF tags 610. The passive RF tags 608 may include RF tags that include an integrated circuit (IC), an antenna, and a transponder. The passive RF tags 608 may not include a battery. The passive RF tags 608 may be powered by inductive coupling, backscatter radio, and/or a surface acoustic wave. Inductive coupling may refer to a scenario in which a transmitter and a receiver are coupled through a magnetic field, where a transmitter generated magnetic field flows into the receiver. The transmitter and the receiver may be sensitive to distance and orientation. In an example, a RF tag that is powered by inductive coupling may communicate at a high frequency (HF) range of around 13.56 MHz and at a low frequency (LF) range of 125 or 135 kHz. Backscatter radio may refer to a communication device that may be controlled to reflect/backscatter signals with different amplitude, phase, and frequency. In an example, an RF tag that is powered by backscatter radio may communicate at an ultra-high frequency (UHF) of around 902-928 MHz and at microwave frequencies, such as 2400-2483.5 MHz and 5725-5850 MHz. A device powered by surface acoustic wave may convert an electric magnetic wave into an acoustic wave which propagates in a surface. In an example, an RF tag that is powered by a surface acoustic wave may communicate at a microwave frequency, such as 2400-2483.5 MHz.

The semi-passive RF tags 610 may include RF tags that include an IC, an antenna, and energy storage (e.g., a batteries, rechargeable batteries, super capacitors, etc.). The battery may increase communications reliability and may increase a sensitivity of power harvesting circuitry while increasing costs. The semi-passive RF tags 610 may be powered by inductive coupling and/or backscatter radio (described above). The semi-passive RF tags 610 may store energy/power obtained via the inductive coupling and/or the backscatter radio in the energy storage.

The transceiver based RF tags 606 may include active RF tags 612. The active RF tags 612 may include RF tags that include an integrated circuit, an antenna, a battery, and an on-board transmitter. The battery may increase communications reliability and may increase a sensitivity of power harvesting circuitry while increasing costs. In an example, the on-board transmitter may be a transceiver. The active RF tags 612 may communicate via a Tx/Rx radio at UHFs (e.g., 902-928 MHz) and/or at microwave frequencies (e.g., 2400-2483.5 and 5725-5850 MHz). The active RF tags 61

In general, the passive RF tags 608 may be associated with a lower range, a lower complexity, and a lower cost compared to the semi-passive RF tags 610. In general, the semi-passive RF tags 610 may be associated with a lower range, a lower complexity, and a lower cost compared to the active RF tags 612.

Figure 7:
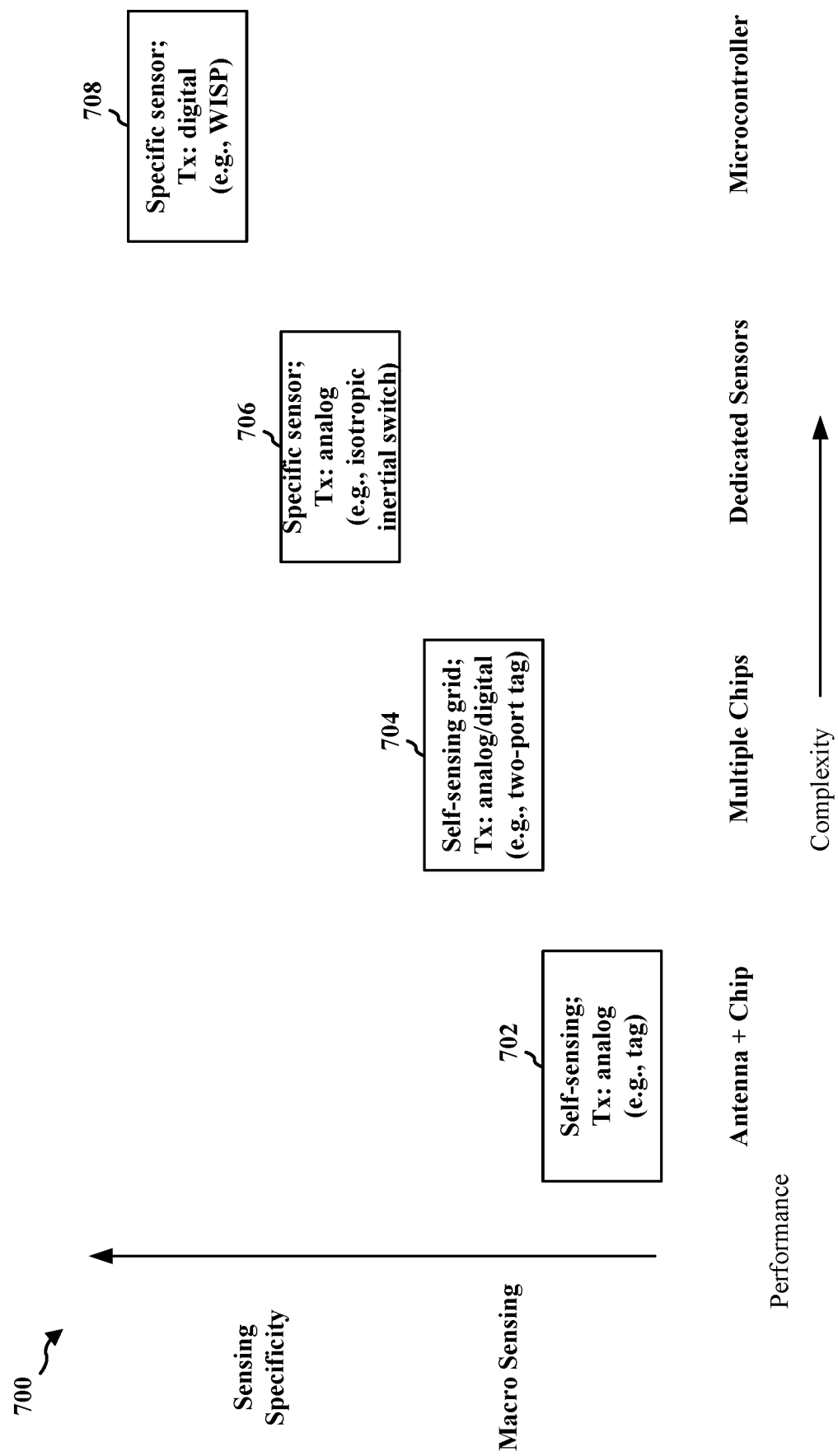
FIG. 7 is a diagram illustrating example aspects of RFID tags.

FIG. 7 is a diagram 700 illustrating example aspects of RFID tags. A RFID tag may perform passive energy harvesting. A RFID tag may perform self-sensing using an antenna as a sensor. In an example, macroscopic changes with respect to the RFID tag may be detected by a RFID reader by performing a measurement, such as a received signal strength indicator (RS SI) measurement. A RFID tag may also be equipped with sensors such as a temperature sensor, a camera, etc. A RFID tag may report sensor readings. In an example, a base station (e.g., a gNB) may provide power to the RFID tag (e.g., via backscatter radio and/or inductive coupling) wirelessly and the RFID tag may utilize the power for sensing and/or reporting sensing results to the base station.

As illustrated in the diagram 700, a RFID tag may be categorized according to a sensing mechanism (e.g., self-sensing or by a specific sensor) and a mode of data transmission. A first category 702 of RFID tag may include RFID tags that perform self-sensing using an antenna. The first category 702 of RFID tag may be associated with analog data transmissions. The first category 702 of RFID tag may include a RFID tag that includes an antenna and a chip. The first category 702 of RFID tag may be associated with macro sensing.

A second category 704 of RFID tag may include RFID tags that perform self-sensing using a grid. The second category 704 of RFID tag may be associated with analog data transmissions and/or digital data transmissions. The second category 704 of RFID tag may include a RFID tag that includes multiple chips. The second category 704 of RFID tag may be associated with macro sensing. In an example, the second category 704 of RFID tag may include a two-port tag.

A third category 706 of RFID tag may include RFID tags that perform dedicated sensing (e.g., using a temperature sensor, a camera, etc.). The third category 706 of RFID tag may be associated with analog data transmissions. The third category 706 of RFID tag may include a RFID tag that includes a dedicated sensor (or sensors). The third category 706 of RFID tag may be associated with a specific type of sensing (e.g., temperature). In an example, the third category 706 of RFID tag may include an isotropic inertial switch.

A fourth category 708 of RFID tag may include RFID tags that perform dedicated sensing (e.g., using a temperature sensor, a camera, etc.). The fourth category 708 of RFID tag may be associated with digital data transmissions. The fourth category 708 of RFID tag may include a RFID tag that includes a microcontroller. The fourth category 708 of RFID tag may be associated with a specific type of sensing (e.g., temperature). In an example, the fourth category 708 of RFID tag may include a wireless identification and sensing platform (WISP).

Figure 8:
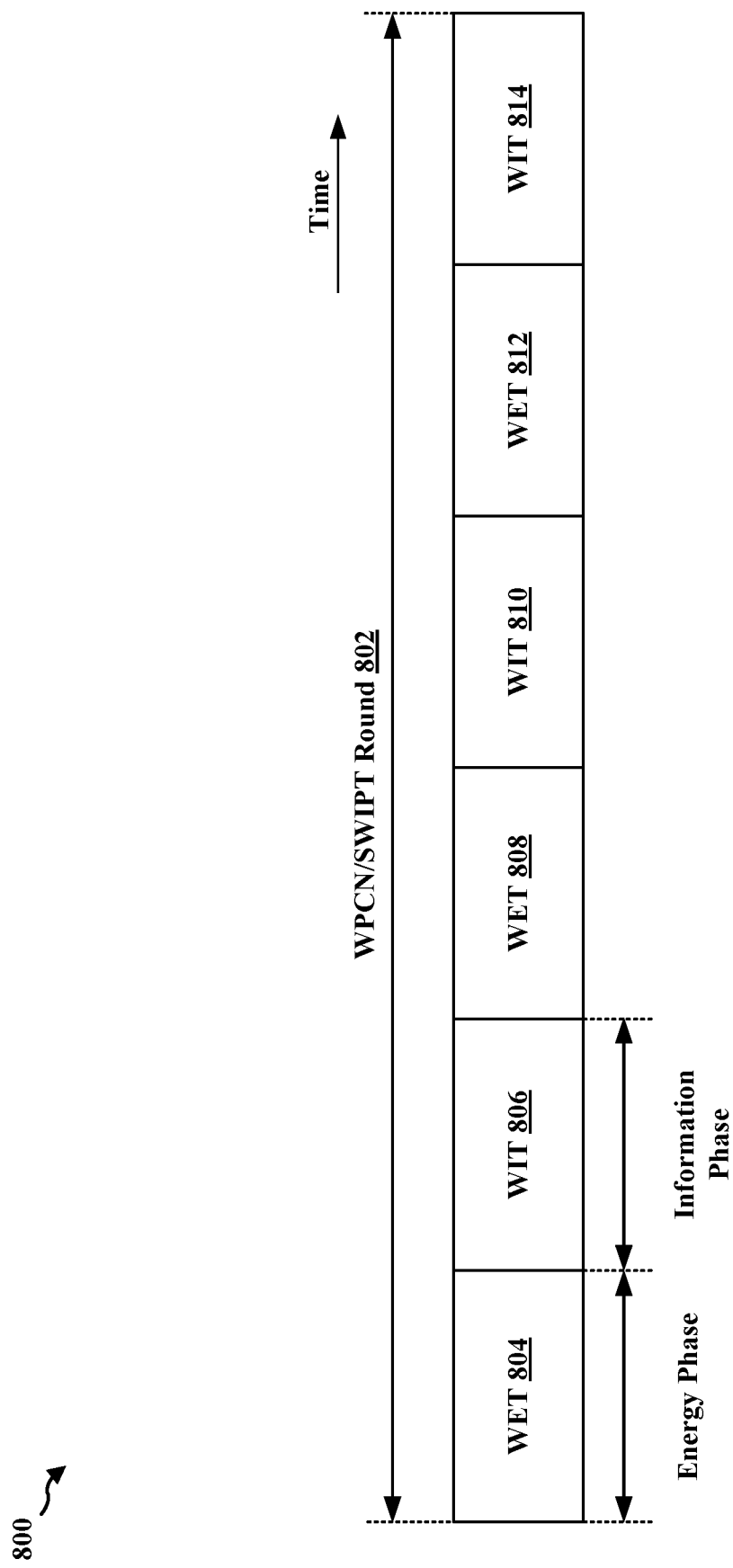
FIG. 8 is a diagram illustrating an example of a wireless energy transfer (WET) and wireless information transfer (WIT) timeline.

FIG. 8 is a diagram 800 illustrating an example of a WET and WIT timeline. The WET and WIT timeline may be referred to as a wireless powered communication network (WPCN) and/or a simultaneous wireless information and power transfer (SWIPT) round 802. The WPCN/SWIPT round 802 may include one or more WET phases 804, 808, 812 and one or more WIT phases 806, 810, 814. The WET phases 804, 808, 812 may be referred to as energy phases. During an energy phase, a EH node may harvest energy from a wireless signal, e.g., as described in connection with any of the aspects described in connection with FIGS. 4 and/or 5. The EH node may harvest energy via backscatter radio, inductive coupling, a surface acoustic wave, a solar panel, a wind turbine, and/or a hydroelectric turbine. The WIT phases 806, 810, 814 may be referred to as information phases. During an information phase, the EH node may transmit data, receive data, perform sensor measurements, and/or perform other computational tasks.

During the WET phases 804, 808, 812, a base station (e.g., a gNB) or another energy transfer device may deliver wireless energy to power an EH device of a UE. In an example, the base station may deliver wireless energy to the UE via a backscatter radio. A UE that reports energy storage capabilities (e.g., passive, semi-passive, or active) may aid the base station in determining an energy charging time for the UE and/or strategies for communicating with the UE (e.g., power control). In an example, a UE with passive energy storage capabilities may utilize a continuous energy signal transfer before each communication. In an example, a UE with semi-passive energy storage capabilities may utilize an intermittent energy signal transfer before energy storage depletes. In an example, a UE with active energy storage capabilities may not utilize an energy signal transfer.

A EH node (e.g., a UE that includes EH capabilities) may utilize different energy storage devices for communication and sensing, that is, the EH node may include a first energy storage device that stores first energy used for communications with a base station and a second energy storage device that stores second energy used for powering a sensor of the EH node. In an example, the EH node may harvest energy during the WET phases 804, 808, 812 and the EH node may utilize the energy during the WIT phases 806, 810, 814. The EH node may accumulate energy during one or more of the WET phases 804, 808, 812. The EH node may skip one or more of the WIT phases 806, 810, 814 if the energy accumulated during the one or more of the WET phases 804, 808, 812 is insufficient for transmission and/or sensing purposes.

A EH node may report an energy storage capability to a network (e.g., to a base station, such as a gNB). For instance, different EH nodes may have different energy storage capacities/battery types. A base station may be able to manage power/energy delivery to a EH node if the base station is informed as to a power consumption (e.g., during a WIT phase) of the EH node for communications and/or sensing. If the base station obtains data pertaining to an energy storage capacity and/or a power consumption of the EH node, the base station can manage energy transfer and a duty cycle of a communication phase (e.g., the WIT phases 806, 810, 814) in an efficient manner. For instance, the base station may wirelessly deliver energy to the EH node in a manner that ensures that a WIT phase is not skipped due to the EH node having insufficient energy.

As noted above, a device (e.g., a UE) may include a EH harvesting modality (e.g., a backscatter radio). In an example, the device may receive an energy transfer signal from a network node. The device may harvest energy from the energy transfer signal to perform an operation during a communication phase with the network node or perform sensing via sensors of the device. The device may also store the energy in a battery. If the device lacks sufficient energy for the communication phase with the network node, the device may skip the communication phase. Similarly, if the device lacks sufficient energy to perform sensing, the device may not perform the sensing. Various technologies pertaining to a power consumption model for an energy harvesting device are disclosed herein. In an example, a device that supports energy harvesting obtains, via at least one energy harvesting operation, energy from a wireless transmission. The device transmits, for a network node, an indication of power consumption of the device for at least one of wireless communications or sensing at the device. The indication of the power consumption of the device may enable the network node to manage an energy transfer and duty cycle of a communication phase of the device in an energy efficient manner such that communications are not skipped due to the device lacking sufficient energy and/or such that the device does not skip sensing due to the device lacking sufficient energy.

Figure 9:
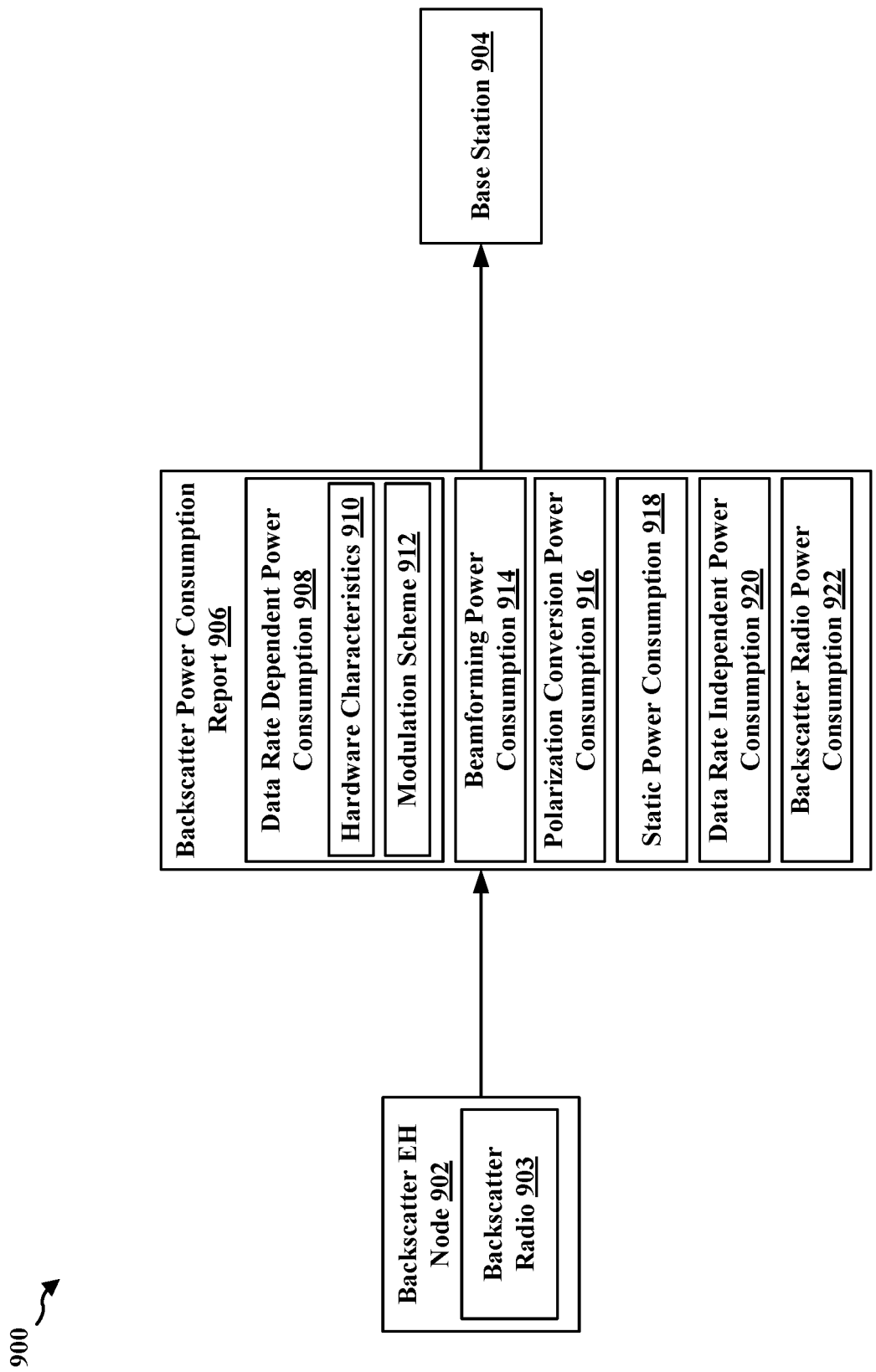
FIG. 9 is a diagram illustrating an example of a backscatter power consumption report transmitted by a backscatter EH node to a base station.

FIG. 9 is a diagram 900 illustrating an example of a backscatter power consumption report 906 transmitted by a backscatter EH node 902 to a base station 904. The backscatter EH node 902 may be a UE. The backscatter EH node 902 may include a backscatter radio 903. Different backscatter radios may have different information transceivers. The backscatter radio 903 may include some or all of the aspects described above in the description of FIGS. 4-6.

Figure 10:
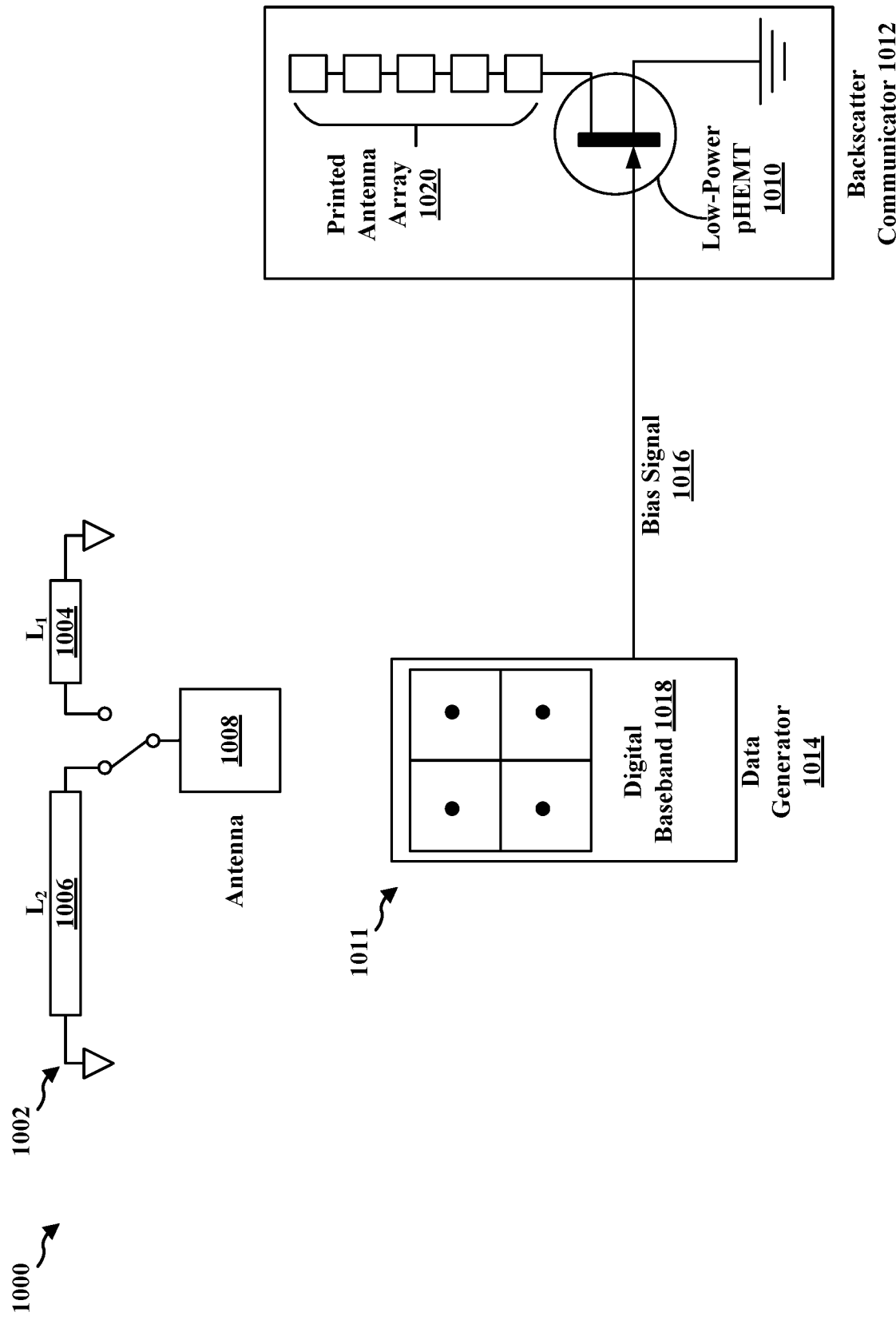
FIG. 10 is a diagram illustrating example aspects of backscatter radio.

The backscatter power consumption report 906 may include a data rate dependent power consumption 908. The data rate dependent power consumption 908 may be based on hardware characteristics 910 (i.e., implementations) of the backscatter EH node 902 and/or a modulation scheme 912 utilized by the backscatter radio 903 for wireless communications. In an example, the modulation scheme may be amplitude-shift keying (ASK), on-off keying (OOK) modulation, or quadrature amplitude modulation (QAM). Referring to FIG. 10, a diagram 1000 illustrating example aspects of backscatter radio is presented. A backscatter radio transmission may utilize a relatively low amount of power (e.g., 10s-100s of nW). In one aspect, a backscatter radio (e.g., the backscatter radio 903) may be implemented to operate at FR1 using a RF switch. In one aspect, a backscatter radio (e.g., the backscatter radio 903) may be implemented to operate at FR1 using a high rate transistor. A EH node (e.g., the backscatter EH node 902) may report a data-rate dependent power consumption for a data rate of 1 kbps. In one aspect, power consumption for the backscatter radio increases linearly with the data rate.

In one aspect, a backscatter radio (e.g., the backscatter radio 903) may be implemented to operate at mm-wave frequencies using other transistors, such as a single pole double throw (SPDT) switch 1002 or a pseudomorphic high electron mobility transistor (pHEMT) 1010. The SPDT switch 1002 may support ASK modulation and/or OOK modulation at mm-wave frequencies. The SPDT switch 1002 may support backscatter communications at FR2. The backscatter radio may utilize the SPDT switch 1002 to switch between a first transmission line 1004 ($L_1$) and a second transmission line 1006 ($L_2$) of different lengths in order to modulate a signal. The first transmission line 1004 and the second transmission line 1006 may have different impedances. When an antenna 1008 is connected to the first transmission line 1004, the antenna 1008 may be tuned such that the antenna 1008 resonates and reflects a signal back to a base station (e.g., the base station 904). When the antenna 1008 is connected to the second transmission line 1006, the antenna is not tuned and thus does not reflect the signal back. By selectively connecting to the first transmission line 1004 and the second transmission line 1006, the backscatter radio may change an amplitude of a reflected signal and hence modulate the signal. Thus, by observing whether the SPDT switch has absorbed or reflected a signal, a base station may communicate with a EH node (e.g., the backscatter EH node 902).

The pHEMT 1010 may support QAM. The pHEMT 1010 may support backscatter communications at FR2. The pHEMT 1010 may be part of a backscatter communicator 1012. The backscatter communicator 1012 and a data generator 1014 may be part of a backscatter communication system 1011. The data generator 1014 may generate a bias signal 1016 based on a QAM symbol in digital baseband 1018. The pHEMT 1010 may receive the bias signal 1016. A printed antenna array 1020 that is coupled to the pHEMT 1010 may emit a signal based on the bias signal 1016, thus enabling the QAM symbol to be transmitted.

Figure 11:
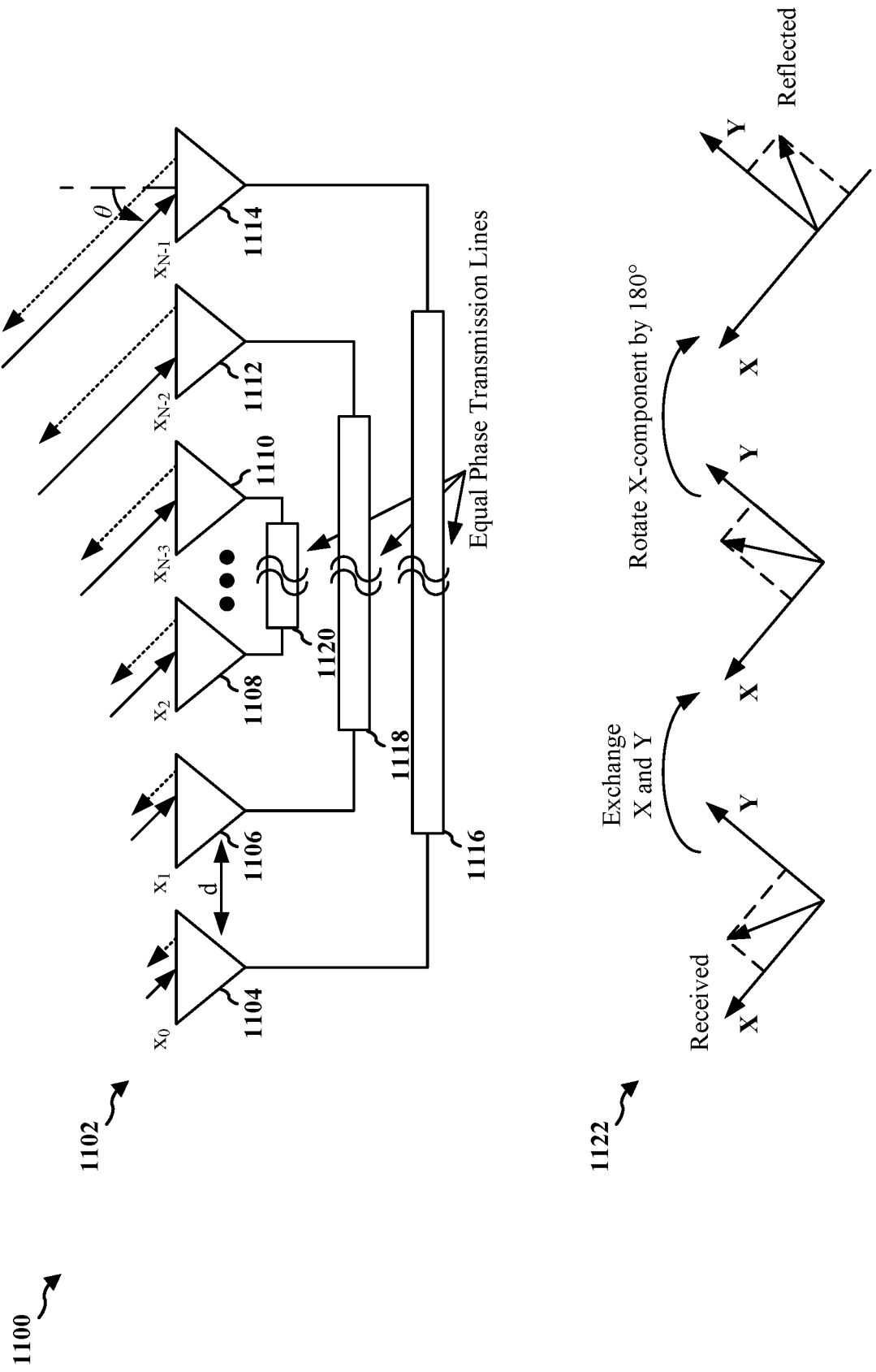
FIG. 11 is a diagram illustrating example aspects of beamforming and polarization conversion of backscatter radio.

Referring back to FIG. 9, the backscatter power consumption report 906 may include a beamforming power consumption 914 and/or a polarization conversion power consumption 916. The beamforming power consumption 914 may include an indication of power used by the backscatter EH node 902 for beamforming of backscattered signals. The indication of power used for beamforming may be a base power consumption. Beamforming may increase a coverage range of the backscatter EH node 902. The backscatter EH node 902 may include a beamforming network. The beamforming network may be active or passive, which may lead to different power consumptions. The polarization conversion power consumption 916 may include an indication of power used by the backscatter EH node 902 for polarization conversion. The indication of power used for polarization conversion may be a base power consumption. A mm-wave backscatter radio (e.g., the backscatter radio 903) may support passive polarization conversion. The beamforming power consumption 914 and/or the polarization conversion power consumption 916 may be independent of a data rate used for wireless communications at the backscatter EH node 902, e.g., which may be referred to as a base power consumption. Referring to FIG. 11, a diagram 1100 illustrating various aspects of beamforming and polarization conversion is illustrated. The diagram 1100 includes an antenna array 1102 that may be used for beamforming purposes. The antenna array 1102 may be associated with passive beamforming. The antenna array 1102 may be associated with a beamforming gain. The antenna array 1102 includes antenna elements 1104-1114. Each of the antenna elements 1104-1114 may be separated by a distance (d). Each of the antenna elements 1104-1114 may reflect a signal received by a mirrored antenna. For instance, a signal received at antenna element 1104 may be passed through (equal phase) transmission line 1116 and reflected through antenna element 1114. Likewise, a signal received at antenna element 1114 may be passed through transmission line 1116 and reflected through antenna element 1104. Similarly, a signal received at antenna element 1106 may be passed through (equal phase) transmission line 1118 and reflected through antenna element 1112. Likewise, a signal received at antenna element 1112 may be passed through transmission line 1118 and reflected through antenna element 1106. Furthermore, a signal received at antenna element 1108 may be passed through (equal phase) transmission line 1120 and reflected through antenna element 1110. Likewise, a signal received at antenna element 1110 may be passed through transmission line 1120 and reflected through antenna element 1108.

The diagram 1100 also includes an illustration 1122 that depicts converting a polarization of an incoming signal to an orthogonal of the signal. A backscatter radio (e.g., the backscatter radio 903) may exchange an X port and a Y port associated with a signal and perform a 180° phase shift on the X port. The backscatter radio may be communicating in a full duplex mode as the backscatter radio may be simultaneously receiving a wireless energy signal from a base station and transmitting data to the base station using energy from the wireless energy signal. Polarization conversion may be useful to mitigate (full-duplex) interference between simultaneously transmitted and received signals at the backscatter radio.

Referring back to FIG. 9, the backscatter power consumption report 906 may include a static power consumption 918 of the backscatter EH node 902. The static power consumption 918 may include an indication of power consumption of the backscatter EH node 902 for processing DL information and/or preparing data for transmission (e.g., cyclic redundancy check (CRC) computation, protocol stack processing, etc.). The static power consumption 918 may include power consumed by a MCU, an IC, or a CPU. The backscatter power consumption report 906 may include a data rate independent power consumption 920. The backscatter power consumption report 906 may include a backscatter radio power consumption 922.

Figure 12:
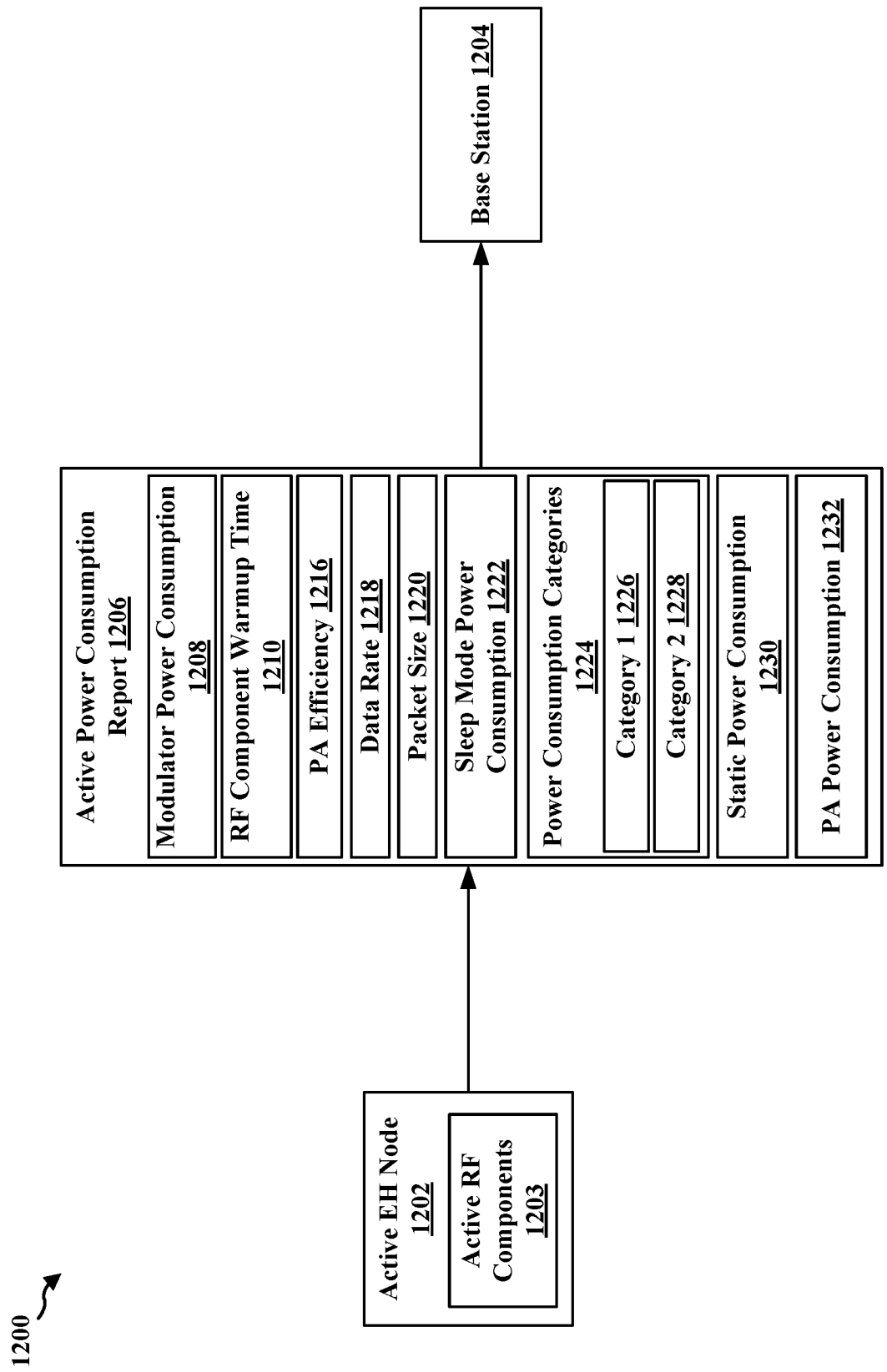
FIG. 12 is a diagram illustrating an example of an active power consumption report transmitted by an active EH node to a base station.

FIG. 12 is a diagram 1200 illustrating an example of an active power consumption report 1206 transmitted by an active EH node 1202 to a base station 1204. The active EH node 1202 may be or include a UE. The active EH node 1202 may include active RF components 1203. The active RF components 1203 may include oscillator(s), mixer(s), and/or power amplifier(s). The active RF components 1203 may include aspects of the UE 350 described above.

The active EH node 1202 may generate a signal using the active RF components 1203. In an example, for low-power consumption, the active EH node 1202 may utilize OOK modulation and/or frequency shift keying (FSK) modulation. In an example, low output power may be generated by a transceiver of the active EH node 1202.

In one aspect, energy consumption ($E_{Total}$) for a packet transmission using the active RF components 1203 (i.e., using an active radio) is provided by equation (I) below.

$$E_{Total} = P_{Mod}T_{Start} + (P_{Mod} + P_{Tx})L/R \tag{I}$$

In equation (I), $P_{Mod}$ may refer to a power consumption of the active RF components 1203. $T_{Start}$ may refer to a warm-up time for the active RF components 1203 to be tuned to a steady state. L may refer to a size of a packet used for wireless communications at the active EH node 1202. R may refer to a data rate used for wireless communications at the active EH node 1202. $P_{Tx}$ may refer to a power amplifier (PA) efficiency. $P_{Tx}$ is provided by equation (II) below.

$$P_{Tx} = P_{Tx}'/\gamma \tag{II}$$

In equation (II), $P_{Tx}'$ may refer to a signal output power of the active RF components 1203. $\gamma$ may refer to a power amplifier efficiency constant.

For relatively high-power output signals, $P_{Tx}$ may be much greater than $P_{Mod}$. As such, power amplifier power consumption may have a greater impact on $E_{Total}$ compared to other elements of equation (I). For relatively low-power output signals, $P_{Mod}$ may have a greater impact on $E_{Total}$ compared to other elements of equation (I). For relatively large packets, L/R may be much greater than $T_{Start}$. As such, a warm-up power consumption may be negligible. For relatively short packets, a warm-up power consumption may have a greater impact on $E_{Total}$ compared to other elements of equation (I).

The active power consumption report 1206 may include a modulator power consumption 1208 that is indicative of power consumed by a modulator of the active EH node 1202. The modulator power consumption 1208 may be $P_{Mod}$ described above. The active power consumption report 1206 may include a RF component warmup time 1210. The RF component warmup time 1210 may be $T_{Start}$ described above. The active power consumption report 1206 may include a power amplifier (PA) efficiency 1216. The PA efficiency 1216 may be $P_{Tx}$ described above. In an example, the PA efficiency 1216 may include PA efficiencies at different signal output powers. The active power consumption report 1206 may include a data rate 1218. The data rate 1218 may be R described above. The active power consumption report 1206 may include a packet size 1220. The packet size 1220 may be L described above.

In one aspect, the active power consumption report 1206 may include a sleep mode power consumption 1222 of the active RF components 1203, that is, a power consumption of the active RF components 1203 while the active EH node 1202 is in sleep mode (i.e., a deep sleep mode). In one aspect, the base station 1204 may infer an efficient energy transmission mode from the active power consumption report 1206. For instance, the base station 1204 may infer a duty cycle, a data rate, and/or a packet size based on the active power consumption report 1206.

In one aspect, the active power consumption report 1206 may include an indication of a category in power consumption categories 1224 to which the active EH node 1202 belongs. Each of the power consumption categories 1224 may be associated with different power consumptions/different data transmission schemes. The power consumption categories 1224 may be based on $P_{Mod}$, $T_{Start}$, and/or $P_{Tx}$ as described above. In some aspects, the power consumption categories 1224 may be based on defined threshold values. The active power consumption report 1206 may indicate that the active EH node 1202 belongs to a first category 1226. The first category 1226 may be associated with relatively high $P_{Mod}$ and $T_{Start}$ values which may indicate a relatively long warm-up time and relatively high modulator power consumption. As such, the base station 1204 may determine that a low duty cycle with a large packet size may be energy efficient for wireless communications with the active EH node 1202. The active power consumption report 1206 may indicate that the active EH node 1202 belongs to a second category 1228. The second category 1228 may be associated with relatively low $P_{Mod}$ and $T_{Start}$ values which may indicate a relatively low stand-by power consumption. As such, the base station 1204 may determine that a short packet size may be energy efficient for wireless communications with the active EH node 1202.

In one aspect, the active power consumption report 1206 may include an indication of static power consumption 1230 by the active EH node 1202. The static power consumption 1230 may include a power consumption for decoding a DL signal. The static power consumption 1230 may also include a power consumption of a MCU/IC for computing (or for non-communication related processing). In one aspect, the active power consumption report 1206 may include a PA power consumption 1232.

Figure 13:
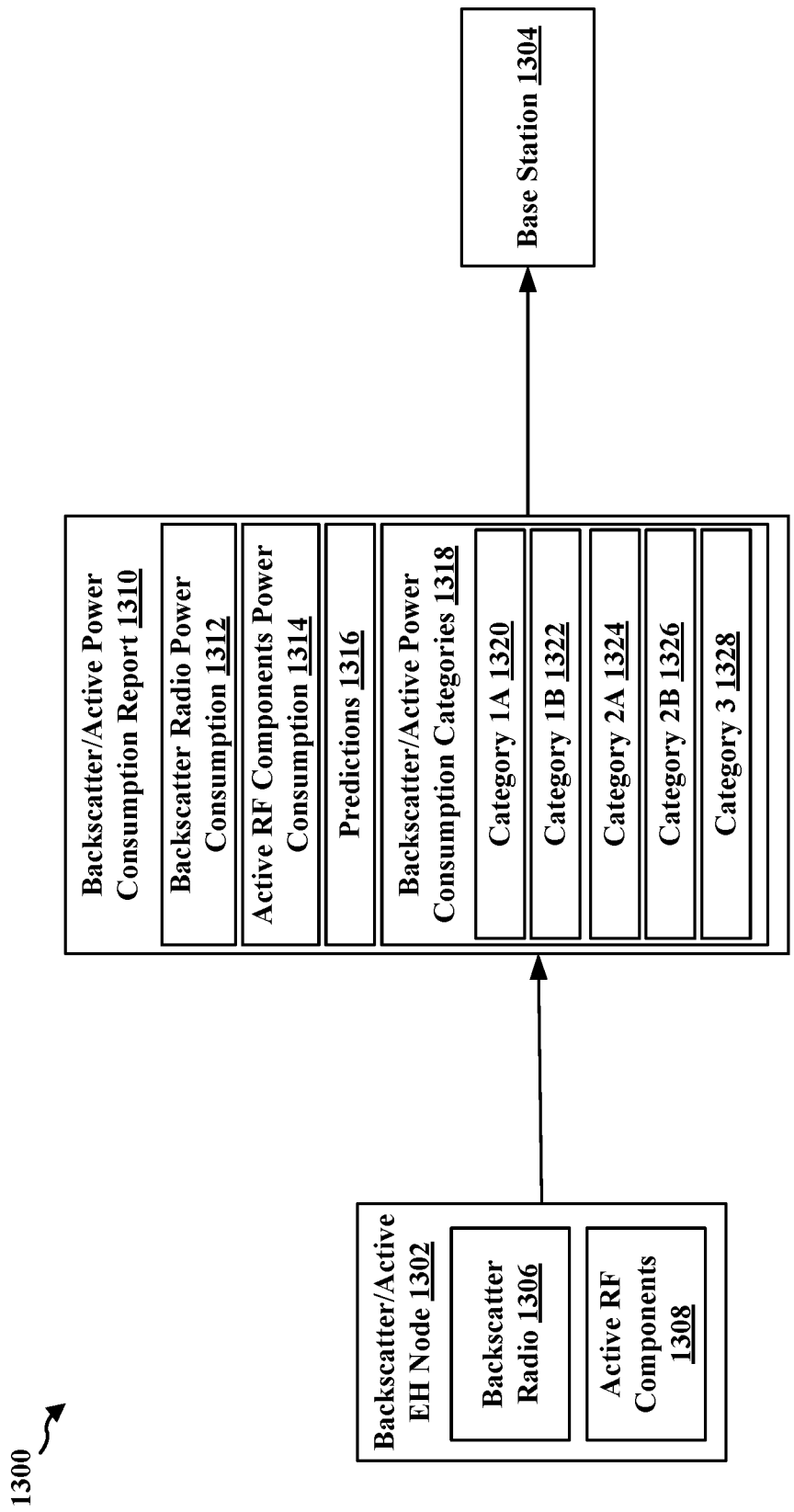
FIG. 13 is a diagram illustrating an example of a backscatter/active power consumption report transmitted by a backscatter/active EH node to a base station.

FIG. 13 is a diagram 1300 illustrating an example of a backscatter/active power consumption report 1310 transmitted by a backscatter/active EH node 1302 to a base station 1304. The backscatter/active EH node 1302 may be or include a UE. The backscatter/active EH node 1302 may include a backscatter radio 1306. The backscatter radio 1306 may include components described in the description of FIGS. 4-6 and may perform similar or the same functionality as described in the description of FIGS. 4-6. The backscatter radio 1306 may be or include the backscatter radio 903 described above. The backscatter/active EH node 1302 may also include active RF components 1308. The active RF components 1308 may include oscillator(s), mixer(s), and/or power amplifier(s). The active RF components 1308 may include aspects of the UE 350 described above. The active RF components 1308 may include the active RF components 1203 described above. The base station 1304 may duty cycle between the backscatter radio 1306 and the active RF components 1308 based on the backscatter/active power consumption report 1310 for uplink and/or downlink communications with the backscatter/active EH node 1302.

The backscatter/active power consumption report 1310 may include a backscatter radio power consumption 1312 of the backscatter radio 1306, that is, an indication of power consumed by the backscatter radio 1306 for wireless communications (as well as other purposes). The backscatter radio power consumption 1312 may include some or all of the aspects described above in the description of FIGS. 9-11. The backscatter/active power consumption report 1310 may include an active RF components power consumption 1314, that is, an indication of power consumed by the active RF components 1308. The active RF components power consumption 1314 may include some or all of the aspects described above in the description of FIG. 12.

In one aspect, the backscatter/active EH node 1302 may transmit predictions (i.e., recommendations) to the base station 1304 using the backscatter radio 1306 and/or the active RF components 1308. As such, the backscatter/active power consumption report 1310 may include predictions 1316. In an example, a prediction in the predictions 1316 may indicate that the backscatter/active EH node 1302 is to utilize the backscatter radio 1306 or the active RF components 1308 for wireless communications with the base station 1304 at an instance in time in the future. The prediction may be based on an energy storage capability of the backscatter/active EH node 1302 and/or a stability of an energy source of the backscatter/active EH node 1302 at the instance in time in the future. In an example, a solar energy source may encounter a periodic change, and the prediction may be based on the periodic change.

In one aspect, the backscatter/active power consumption report 1310 may include an indication of a category in backscatter/active power consumption categories 1318 to which the backscatter/active EH node 1302 belongs. The backscatter/active power consumption report 1310 may indicate that the backscatter/active EH node 1302 belongs to a category 1A 1320. EH nodes that belong to the category 1A 1320 may utilize a backscatter radio that is based on OOK modulation scheme. In an example, EH nodes that belong to the category 1A 1320 may consume less than 10 μW per kilobyte per second (kbps). The backscatter/active power consumption report 1310 may indicate that the backscatter/active EH node 1302 belongs to include a category 1B 1322. EH nodes that belong to the category 1B 1322 may utilize a backscatter radio that is based on a high-rate QAM. The high-rate QAM may consume between 10-100 μW (including a polarization conversion). The backscatter/active power consumption report 1310 may indicate that the backscatter/active EH node 1302 belongs to a category 2A 1324. EH nodes that belong to the category 2A 1324 may include active radio components that have a relatively long warm-up power consumption and/or a relatively low output power. The backscatter/active power consumption report 1310 may indicate that the backscatter/active EH node 1302 belongs to a category 2B 1326. EH nodes that belong to the category 2B 1326 may include active radio components that have a relatively short warm-up power consumption. The backscatter/active power consumption report 1310 may indicate that the backscatter/active EH node 1302 belongs to a category 3 1328. EH nodes that belong to the category 3 1328 may include both a backscatter radio and active radio components.

Figure 14:
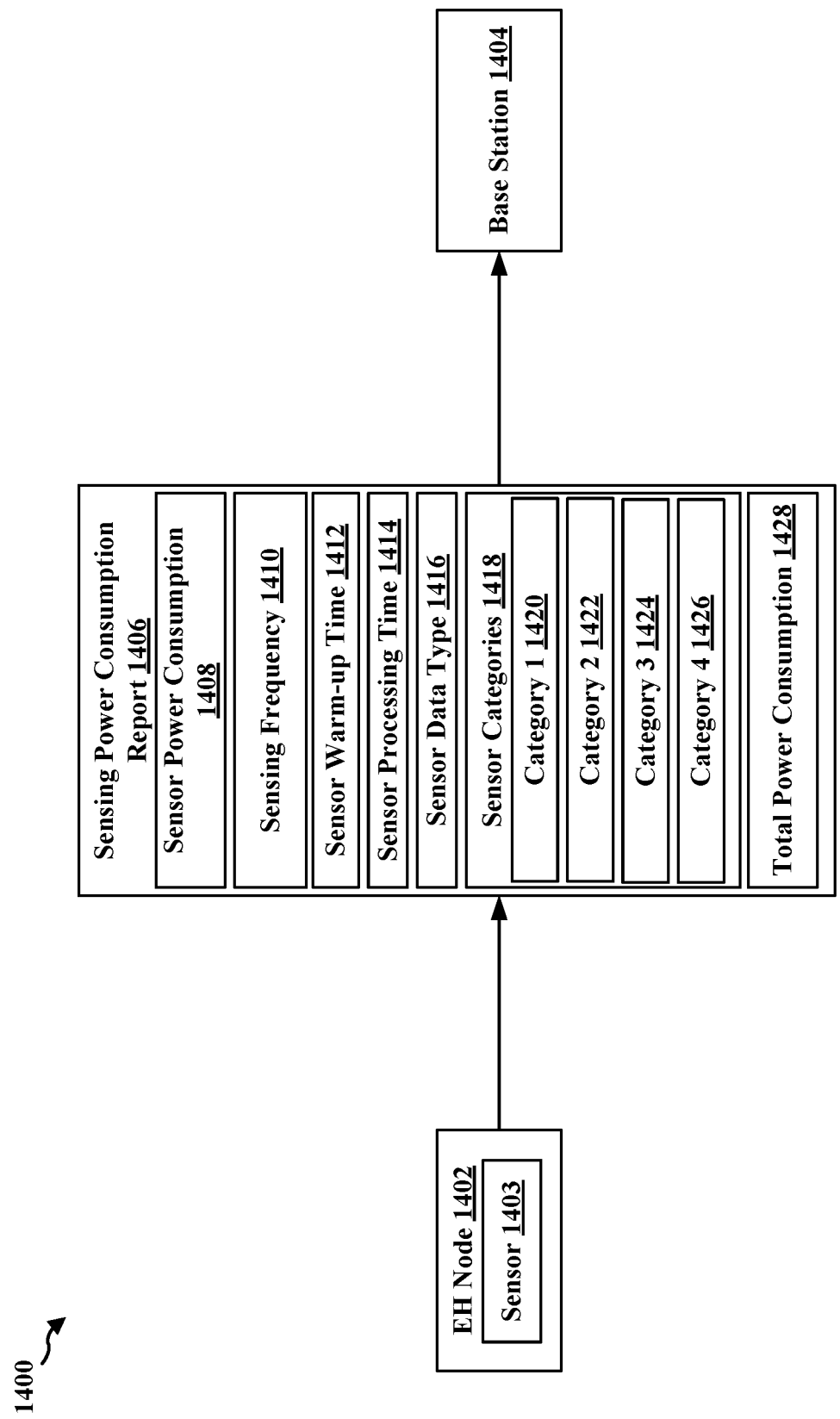
FIG. 14 is a diagram illustrating an example of a sensing power consumption report transmitted by a EH node to a base station.

FIG. 14 is a diagram 1400 illustrating an example of a sensing power consumption report 1406 transmitted by an EH node 1402 to a base station 1404. The EH node 1402 may be or include a UE. The EH node 1402 includes a sensor 1403 (or multiple sensors). In an example, the sensor 1403 may be or include an antenna, a temperature sensor, a humidity sensor, a camera, a motion sensor, a global positioning satellite (GPS), a gyroscope, and/or a radar. The EH node 1402 may be or include the backscatter EH node 902, the active EH node 1202, or the backscatter/active EH node 1302.

The sensing power consumption report 1406 may include details pertaining to sensing performed by the EH node 1402 via the sensor 1403. The EH node 1402 may harvest energy (e.g., via backscatter radio) and use the energy to perform one or more measurements (i.e., use the energy for sensing). In an example, the one or more measurements may include a RSSI measurement, a temperature measurement, a humidity measurement, a captured image, motion data, GPS coordinates, a yaw, pitch, and/or roll, and/or radar data. The sensing power consumption report 1406 may include a power and/or an energy for the EH node 1402 to perform a sensing task via the sensor 1403. The base station 1404 may transmit signaling to the EH node 1402 based upon the sensing power consumption report 1406 that may manage an energy supply and sensing procedure of the EH node 1402. In an example, detailed sensing capability and/or sensing data type of the EH node 1402 may be reported to an application server or a core network. The application server and/or the core network may interpret and/or manage the detailed sensing capability and/or the sensing data type.

The sensing power consumption report 1406 may include a sensor power consumption 1408 of the sensor 1403 when the sensor 1403 performs one or more measurements. The sensor power consumption 1408 may be for performing a sensing task. The sensing power consumption report 1406 may include a sensing frequency 1410 that is indicative of a frequency at which the sensor 1403 performs measurements. In an example, the sensing frequency 1410 may be once per hour, once per day, etc. The sensing power consumption report 1406 may include a sensor warm-up time 1412 that is indicative of a duration of time for the sensor 1403 to warm-up to an active state such that measurements are able to be performed via the sensor 1403. The sensor warm-up time 1412 may also be or include a warm-up time for circuitry of the EH node 1402. The sensing power consumption report 1406 may include a sensor processing time 1414 that is indicative of a duration of time for the EH node 1402 to process results of a sensing task performed via the sensor 1403. The sensing power consumption report 1406 may include a sensor data type 1416 that is indicative of a type of data (e.g., temperature, image, RSSI) generated by the sensor 1403.

In one aspect, the sensing power consumption report 1406 may include an indication of a category in sensor categories 1418 to which the EH node 1402 belongs. The sensor categories 1418 may refer to a type of sensor. The sensing power consumption report 1406 may indicate that the EH node 1402 belongs to a first category 1420. EH nodes that belong to the first category 1420 may include an antenna and may perform "self-sensing" via the antenna. The sensing power consumption report 1406 may indicate that the EH node 1402 belongs to a second category 1422. EH nodes that belong to the second category 1422 may include a specific sensor such as a temperature sensor and/or a humidity sensor. The sensing power consumption report 1406 may indicate that the EH node 1402 belongs to a third category 1424. EH nodes that belong to the third category 1424 may include motion sensors, a GPS sensor, and/or a gyroscope. The sensing power consumption report 1406 may indicate that the EH node 1402 belongs to a fourth category 1426. EH nodes that belong to the fourth category 1426 may include a camera, a radar, and/or a perception related device.

The sensing power consumption report 1406 may include a total power consumption 1428 of the EH node 1402. The total power consumption 1428 may be a power consumption of the EH node 1402 for a combination of performing sensing via the sensor 1403 and wirelessly communicating with the base station 1404. The total power consumption 1428 may include some or all of the aspects discussed above in the descriptions of FIGS. 9-13.

In an example, the EH node 1402 may perform a temperature measurement. A combination of performing the temperature measurement and internal processing of the EH node 1402 may consume 2.77 µJ of energy. In another example, the EH node 1402 may capture a gray-scale image (i.e., a picture) with a 176 pixel×144 pixel frame resolution. A combination of capturing the gray-scale image and storing the gray-scale image in memory may consume 10.6 mJ of energy. In some aspects, the sensor 1403 may be associated with a minimum voltage for the sensor 1403 to operate. The minimum voltage may be relevant for devices that do not include energy storage devices (e.g., batteries). For instance, a relatively high input power may be used to maintain a voltage.

Figure 15:
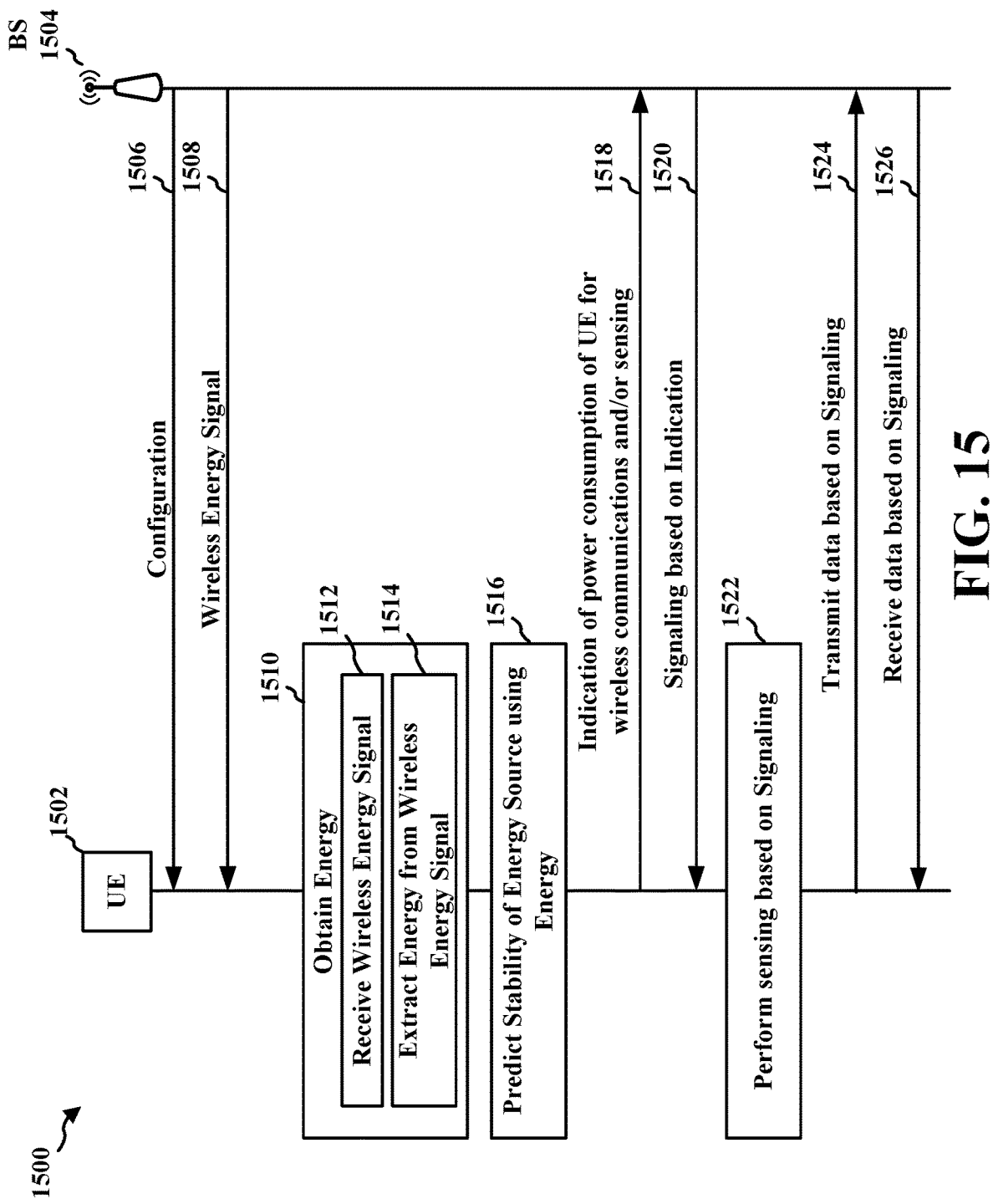
FIG. 15 is a diagram illustrating an example communications flow between a UE and a base station.

FIG. 15 is a diagram 1500 illustrating an example communications flow between a UE 1502 and a base station 1504. The UE 1502 may be an EH node. The UE 1502 may include the power harvesting circuit 500. In an example, the UE 1502 may be or include the UE 104, the UE 350, the RFID tag 402, the backscatter EH node 902, the active EH node 1202, the backscatter/active EH node 1302, the EH node 1402, the apparatus 2004. The base station 1504 may be or include the base station 102, the base station 310, the base station 904, the base station 1204, the base station 1304, the base station 1404, or the network entity 2102.

At 1506, the UE 1502 may receive a configuration for reporting power consumption from the base station 1504. The configuration may be for reporting power consumption of at least one of wireless communications at the UE 1502 or sensing performed at the UE 1502. At 1508, the UE 1502 may receive a wireless energy signal from the base station 1504. At 1510, the UE 1502 may obtain energy. In one aspect, at 1512, the UE 1502 may receive the wireless energy signal transmitted by the base station. In such an aspect, at 1514, the UE 1502 may extract energy from the wireless energy signal. In another aspect, at 1510, the UE 1502 may obtain the energy from an energy harvesting modality, such as a solar panel. In one aspect, at 1516, the UE 1502 may predict the stability of an energy source using the energy obtained at 1510. For instance, the UE 1502 may predict a stability of a source energy source.

At 1518, the UE 1502 may transmit an indication of power consumption of the UE 1502 for at least one of wireless communications and/or sensing. The indication of power consumption may include some or all of the aspects of the backscatter power consumption report 906, the active power consumption report 1206, the backscatter/active power consumption report 1310, and/or the sensing power consumption report 1406. The indication may include the prediction generated at 1516.

At 1520, the UE 1502 may receive signaling from the base station 1504 based on the indication of the power consumption. In an example, the signaling may control/manage power/energy delivery to the UE 1502. In an example, the signaling may manage an energy transfer and duty cycle of the UE 1502 in a manner that utilizes time and/or energy associated with the UE 1502 in an efficient manner. In an example, the signaling may indicate a data rate and/or packet size that are to be used by the UE 1502 for transmitting or receiving data/signals. The signaling may include a wireless energy signal. The signaling may be for a backscatter radio of the UE 1502 or another radio of the UE 1502.

At 1522, the UE 1502 may perform sensing based on the signaling. At 1524, the UE 1502 may transmit data based on the signaling received at 1520. The data may include measurements (i.e., results of the sensing performed by the UE 1502 at 1522). At 1526, the UE 1502 may receive data based on the signaling.

Figure 16:
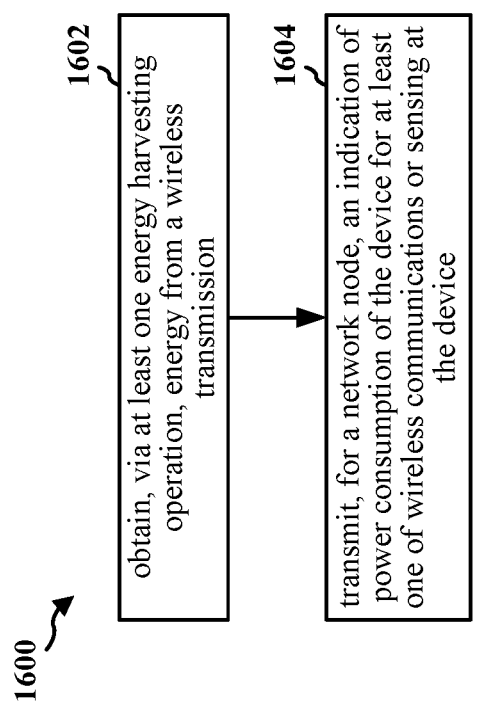
FIG. 16 is a flowchart of a method of wireless communication.

FIG. 16 is a flowchart 1600 of a method of wireless communication. The method may be performed by a device that supports energy harvesting. The method may be performed by a UE (e.g., UE 104, the UE 350, the RFID tag 402, the backscatter EH node 902, the active EH node 1202, the backscatter/active EH node 1302, the EH node 1402, the UE 1502, the apparatus 2004). The method may be associated with various advantages at the device/UE, such as an efficient utilization of energy by the device/UE such that the device/UE does not skip a WIT phase. In an example, the method may be performed by the power consumption component 198.

At 1602, the device obtains, via at least one energy harvesting operation, energy from a wireless transmission. For example, FIG. 15 at 1510 shows that a UE 1502 may obtain energy. In a further example, FIG. 15 at 1512 shows that the UE 1502 may receive a wireless energy signal and FIG. 15 at 1514 shows that the UE 1502 may extract energy from the wireless energy signal. In another example, obtaining the energy may include some or all of the aspects described in the description of FIGS. 4-6. In yet another example, the energy harvesting operation may correspond to one or more of the WET phases 804, 808, 812. In an example, 1602 may be performed by the power consumption component 198.

At 1604, the device transmits, for a network node, an indication of power consumption of the device for at least one of wireless communications or sensing at the device. For example, FIG. 15 at 1518 shows that the UE 1502 may transmit an indication of power consumption of the UE 1502 for wireless communications and/or sensing. In an example, the indication of the power consumption of the device may include some or all of the aspects described above with respect to the backscatter power consumption report 906, the active power consumption report 1206, the backscatter/active power consumption report 1310, and/or the sensing power consumption report 1406. In an example, the at least one of wireless communications or sensing at the device may correspond to one or more of the WIT phases 806, 810, 814. In an example, 1604 may be performed by the power consumption component 198.

Figure 17:
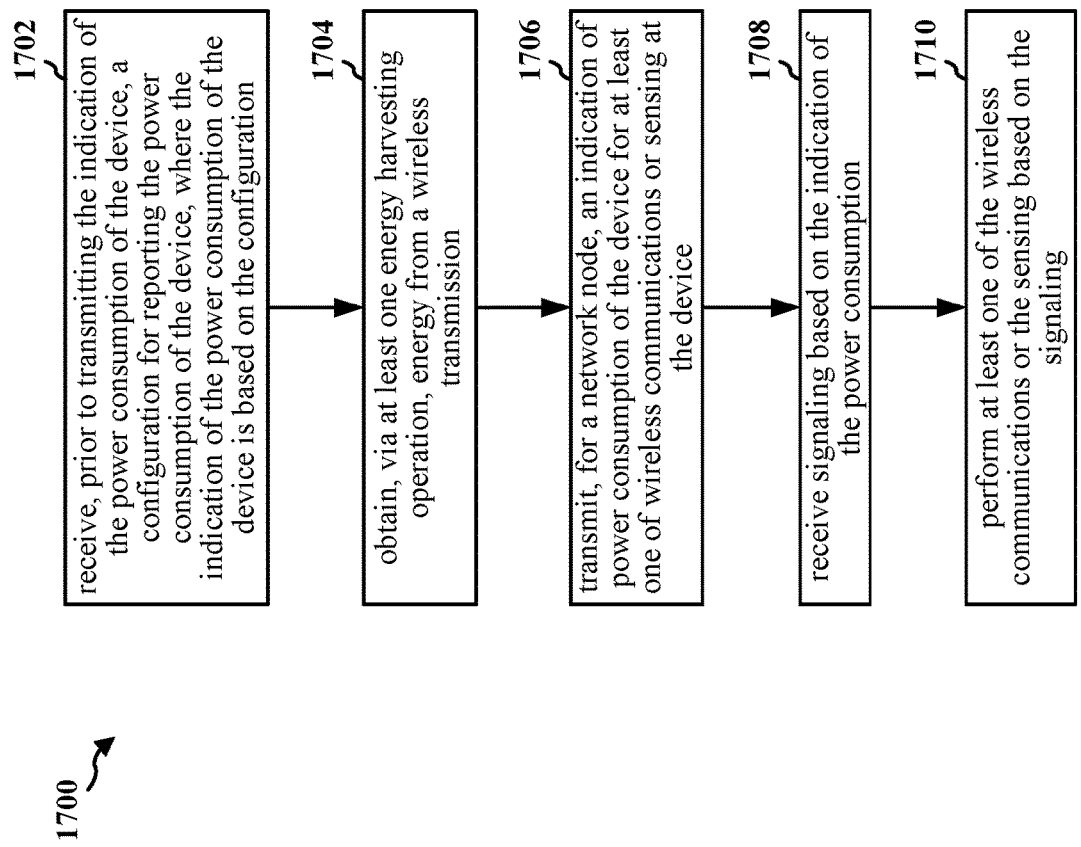
FIG. 17 is a flowchart of a method of wireless communication.

FIG. 17 is a flowchart 1700 of a method of wireless communication. The method may be performed by a device that supports energy harvesting. The method may be performed by a UE (e.g., UE 104, the UE 350, the RFID tag 402, the backscatter EH node 902, the active EH node 1202, the backscatter/active EH node 1302, the EH node 1402, the UE 1502, the apparatus 2004). The method may be associated with various advantages at the device/UE, such as an efficient utilization of energy by the device/UE such that the device/UE does not skip a WIT phase. In an example, the method (including the various aspects described below) may be performed by the power consumption component 198.

At 1704, the device obtains, via at least one energy harvesting operation, energy from a wireless transmission. For example, FIG. 15 at 1510 shows that a UE 1502 may obtain energy. In a further example, FIG. 15 at 1512 shows that the UE 1502 may receive a wireless energy signal and FIG. 15 at 1514 shows that the UE 1502 may extract energy from the wireless energy signal. In another example, obtaining the energy may include some or all of the aspects described in the description of FIGS. 4-6. In yet another example, the energy harvesting operation may correspond to one or more of the WET phases 804, 808, 812. In an example, 1704 may be performed by the power consumption component 198.

At 1706, the device transmits, for a network node, an indication of power consumption of the device for at least one of wireless communications or sensing at the device. For example, FIG. 15 at 1518 shows that the UE 1502 may transmit an indication of power consumption of the UE 1502 for wireless communications and/or sensing. In an example, the indication of the power consumption of the device may include some or all of the aspects described above with respect to the backscatter power consumption report 906, the active power consumption report 1206, the backscatter/active power consumption report 1310, and/or the sensing power consumption report 1406. In an example, the at least one of wireless communications or sensing at the device may correspond to one or more of the WIT phases 806, 810, 814. In an example, 1706 may be performed by the power consumption component 198.

In one aspect, the indication of the power consumption may indicate at least one of: a backscatter radio power consumption for the device, a first power consumption based on polarization conversion, a second power consumption at a data rate, a third power consumption independent of the data rate, a fourth power consumption for processing downlink information, or a fifth power consumption for preparing a data transmission. For example, the indication of the power consumption may include the data rate dependent power consumption 908, the static power consumption 918, the polarization conversion power consumption 916, the data rate independent power consumption 920, and/or a backscatter radio power consumption 922.

In one aspect, the indication of the power consumption may be based on one or more of: at least one radio frequency component for the wireless communication, at least one modulator component of the device, a single pole double throw switch that supports at least one of ASK modulation or OOK modulation, or a pseudomorphic high electron mobility transistor that supports QAM. For example, the indication of the power consumption may include some or all of the aspects described in the descriptions of FIG. 10. The single pole double throw switch may be the SPDT switch 1002. The pseudomorphic high electron mobility transistor may be the pHEMT 1010. The at least one modulator component of the device may be the modulator 516. The at least one radio frequency component may be the energy transfer signal 406 and/or the backscattered modulated information signal 408.

In one aspect, the indication of the power consumption of the device may include a data-rate dependent power consumption. For example, the indication of the power consumption may include the data rate dependent power consumption 908.

In one aspect, the indication of the power consumption of the device may be based on at least one of hardware of the device or a modulation scheme of the device. For example, the indication of the power consumption may be based on the hardware characteristics 910 and/or the modulation scheme 912 of the backscatter EH node 902.

In one aspect, the indication of the power consumption of the device may include a base power consumption of beamforming and the polarization conversion of the device independent of the data rate. For example, the indication of the power consumption may include the beamforming power consumption 914 and/or the polarization conversion power consumption 916. In another example, the indication of the power consumption may include some or all of the aspects described above in the description of FIG. 11.

In one aspect, the device may further include at least one active component including at least one modulator and at least one power amplifier, and the indication of the power consumption of the device may include one or more of: a first power consumption of the at least one modulator, a time for the at least one active component to be tuned in a steady state, a second power consumption of the at least one power amplifier, a preferred data rate for the wireless communications, or a preferred packet size of the wireless communications. For example, the at least one active component may be the active RF components 1203 and the active RF components 1203 may include at least one modulator and at least one power amplifier. In another example, the indication of the power consumption may include the modulator power consumption 1208, the RF component warmup time 1210, the data rate 1218, the packet size 1220, and/or the PA power consumption 1232.

In one aspect, the indication of the power consumption of the device may include a plurality of categories of power consumptions and corresponding preferred data transmission schemes for each of the plurality of categories of the power consumptions. For example, the indication of the power consumption may include the power consumption categories 1224 including the first category 1226 and the second category 1228.

In one aspect, the indication of the power consumption of the device may indicate multiple power consumptions for different types of radios at the device. For example, the indication of the power consumption may include the backscatter radio power consumption 1312 and the active RF components power consumption 1314. In another example, the indication of the power consumption may include the backscatter/active power consumption categories 1318.

In one aspect, the indication of the power consumption of the device may indicate a first power consumption of a backscatter radio and a second power consumption of an active radio. For example, the indication of the power consumption may include the backscatter radio power consumption 1312 and the active RF components power consumption 1314.

In one aspect, the indication of the power consumption of the device may further indicate whether the backscatter radio or the active radio is to be used for the wireless communications, and the indication of the power consumption of the device may be based on a prediction indicative of a stability of a source of the energy at a future time instance. For example, the indication of the power consumption may include the predictions 1316. In another example, FIG. 15 at 1516 shows that the UE 1502 may predict a stability of an energy source.

In one aspect, the sensing of the device may include one or more of: perform a temperature measurement, perform a humidity measurement, capture an image, perform a RSSI measurement, perform a radar measurement, determine a velocity of the device, determine a location of the device, or determine an orientation of the device. For example, FIG. 15 at 1522 shows that the UE 1502 may perform sensing. The sensing may include perform a temperature measurement, perform a humidity measurement, capture an image, perform a RSSI measurement, perform a radar measurement, determine a velocity of the UE 1502, determine a location of the UE 1502, and/or determine an orientation of the UE 1502.

In one aspect, the indication of the power consumption of the device may include one or more of: a type of sensor that is to perform the sensing, a first power consumption of the sensor, a warm up time of the sensor, a time duration for which the sensor is to be active, or a processing time associated with the sensor. For example, the indication of the power consumption may include the sensor power consumption 1408, the sensing frequency 1410, the sensor warm-up time 1412, the sensor processing time 1414, and/or the sensor data type 1416.

In one aspect, at 1702, the device may receive, prior to transmitting the indication of the power consumption of the device, a configuration for reporting the power consumption of the device, where the indication of the power consumption of the device may be based on the configuration. For example, FIG. 15 at 1506 shows that the UE 1502 may receive a configuration for reporting the power consumption of the UE 1502. The indication of the power consumption of the UE 1502 transmitted at 1518 may be based on the configuration. In an example, 1702 may be performed by the power consumption component 198.

In one aspect, at 1708, the device may receive signaling based on the indication of the power consumption. For example, FIG. 15 at 1520 shows that the UE 1502 may receive signaling based on the indication of the power consumption. In an example, 1708 may be performed by the power consumption component 198.

In one aspect, at 1710, the device may perform at least one of the wireless communications or the sensing based on the signaling. For example, FIG. 15 at 1522 shows that the UE 1502 may perform sensing based on the signaling received at 1520. For example, FIG. 15 at 1524 shows that the UE 1502 may transmit data based on the signaling received at 1520. For example, FIG. 15 at 1526 shows that the UE 1502 may receive data based on the signaling received at 1520. In an example, 1708 may be performed by the power consumption component 198.

In one aspect, the signaling may indicate parameters of at least one of an energy harvesting mode of the device or an information transfer mode of the device. For example, the energy harvesting mode of the device may correspond to the WET phases 804, 808, 812 and the information transfer mode of the device may correspond to the WIT phases 806, 810, 814.

Figure 18:
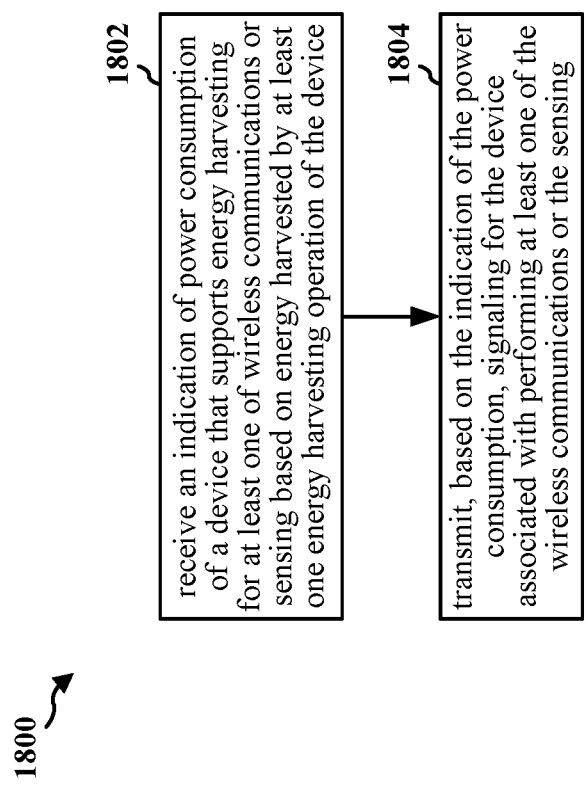
FIG. 18 is a flowchart of a method of wireless communication.

FIG. 18 is a flowchart 1800 of a method of wireless communication. The method may be performed by a network node (e.g., the base station 102, the base station 310, the base station 904, the base station 1204, the base station 1304, the base station 1404, the base station 1504, the network entity 2102). The method may be associated with various advantages at the network node, such as increased communications reliability with a UE vis-à-vis efficient managing of WET phases and WIT phases of the UE. In an example, the method may be performed by the power consumption component 199.

At 1802, the network node receives an indication of power consumption of a device that supports energy harvesting for at least one of wireless communications or sensing based on energy harvested by at least one energy harvesting operation of the device. For example, FIG. 15 at 1518 shows that the base station 1504 may receive an indication of power consumption of the UE 1502 for wireless communications and/or sensing. In an example, the indication of the power consumption of the device may include some or all of the aspects described above with respect to the backscatter power consumption report 906, the active power consumption report 1206, the backscatter/active power consumption report 1310, and/or the sensing power consumption report 1406. In an example, the at least one of wireless communications or sensing at the device may correspond to one or more of the WIT phases 806, 810, 814. In an example, 1802 may be performed by the power consumption component 199.

At 1804, the network node transmits, based on the indication of the power consumption, signaling for the device associated with performing at least one of the wireless communications or the sensing. For example, FIG. 15 at 1520 shows that the base station 1504 may transmit signaling based on the indication of the power consumption. In an example, 1804 may be performed by the power consumption component 199.

Figure 19:
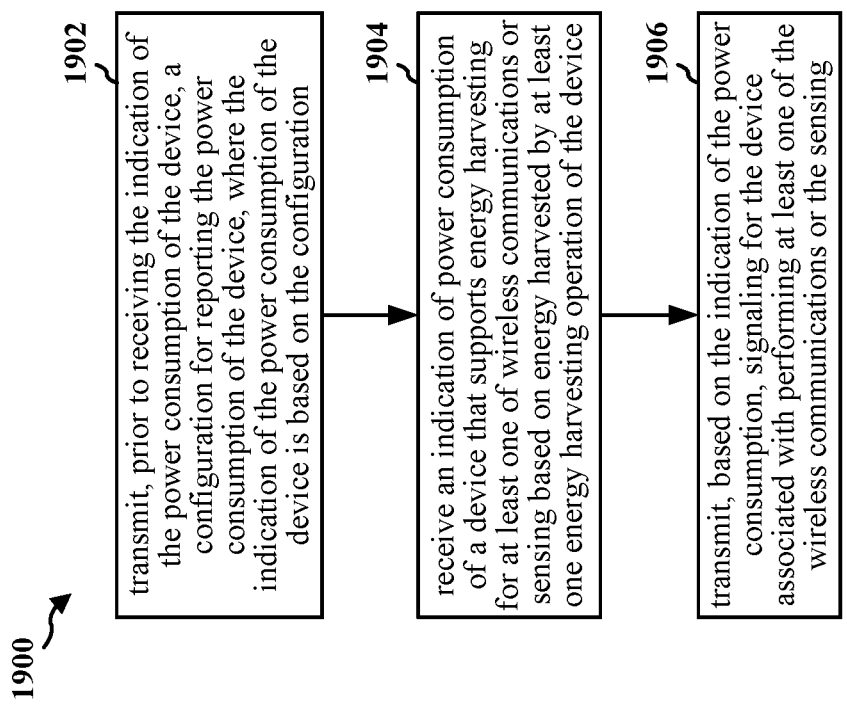
FIG. 19 is a flowchart of a method of wireless communication.

FIG. 19 is a flowchart 1900 of a method of wireless communication. The method may be performed by a network node (e.g., the base station 102, the base station 310, the base station 904, the base station 1204, the base station 1304, the base station 1404, the base station 1504, the network entity 2102). The method may be associated with various advantages at the network node, such as increased communications reliability with a UE vis-à-vis efficient managing of WET phases and WIT phases of the UE. In an example, the method (including the various aspects described below) may be performed by the power consumption component 199.

At 1904, the network node receives an indication of power consumption of a device that supports energy harvesting for at least one of wireless communications or sensing based on energy harvested by at least one energy harvesting operation of the device. For example, FIG. 15 at 1518 shows that the base station 1504 may receive an indication of power consumption of the UE 1502 for wireless communications and/or sensing. In an example, the indication of the power consumption of the device may include some or all of the aspects described above with respect to the backscatter power consumption report 906, the active power consumption report 1206, the backscatter/active power consumption report 1310, and/or the sensing power consumption report 1406. In an example, the at least one of wireless communications or sensing at the device may correspond to one or more of the WIT phases 806, 810, 814. In an example, 1904 may be performed by the power consumption component 199.

At 1906, the network node transmits, based on the indication of the power consumption, signaling for the device associated with performing at least one of the wireless communications or the sensing. For example, FIG. 15 at 1520 shows that the base station 1504 may transmit signaling based on the indication of the power consumption. In an example, 1906 may be performed by the power consumption component 199.

In one aspect, the indication of the power consumption of the device may include one or more of: a first power consumption of at least one modulator of the device, a time for at least one active component of the device to be tuned in a steady state, a second power consumption of at least one power amplifier of the device, a preferred data rate for the wireless communications, or a preferred packet size of the wireless communications. For example, the at least one active component may be the active RF components 1203 and the active RF components 1203 may include at least one modulator and at least one power amplifier. In another example, the indication of the power consumption may include the modulator power consumption 1208, the RF component warmup time 1210, the data rate 1218, the packet size 1220, and/or the PA power consumption 1232.

In one aspect, the indication of the power consumption of the device may include a data-rate dependent power consumption. For example, the indication of the power consumption may include the data rate dependent power consumption 908.

In one aspect, the indication of the power consumption of the device may be based on at least one of hardware of the device or a modulation scheme of the device. For example, the indication of the power consumption may be based on the hardware characteristics 910 and/or the modulation scheme 912 of the backscatter EH node 902.

In one aspect, the indication of the power consumption of the device may include a base power consumption of beamforming and the polarization conversion of the device independent of the preferred data rate. For example, the indication of the power consumption may include the beamforming power consumption 914 and/or the polarization conversion power consumption 916. In another example, the indication of the power consumption may include some or all of the aspects described above in the description of FIG. 11.

In one aspect, the indication of the power consumption of the device may include a plurality of categories of power consumptions and corresponding preferred data transmission schemes for each of the plurality of categories of the power consumptions. For example, the indication of the power consumption may include the power consumption categories 1224 including the first category 1226 and the second category 1228.

In one aspect, the indication of the power consumption of the device may include a first power consumption of a backscatter radio of the device and a second power consumption of an active radio of the device. For example, the indication of the power consumption may include the backscatter radio power consumption 1312 and the active RF components power consumption 1314.

In one aspect, the indication of the power consumption of the device may indicate whether the backscatter radio or the active radio is to be used for the wireless communications, and the indication of the power consumption of the device may be based on a prediction that is indicative of a stability of a source of the energy of the device at a future time instance. For example, the indication of the power consumption may include the predictions 1316.

In one aspect, the indication of the power consumption of the device may include one or more of: a type of sensor, a first power consumption of the sensor, a warm up time of the sensor, a time duration for which the sensor is to be active, or a processing time associated with the sensor. For example, the indication of the power consumption may include the sensor power consumption 1408, the sensing frequency 1410, the sensor warm-up time 1412, the sensor processing time 1414, and/or the sensor data type 1416.

In one aspect, at 1902, the network node may transmit, prior to receiving the indication of the power consumption of the device, a configuration for reporting the power consumption of the device, where the indication of the power consumption of the device may be based on the configuration. For example, FIG. 15 at 1506 shows that the base station 1504 may transmit a configuration for reporting the power consumption of the UE 1502. The indication of the power consumption of the UE 1502 received at 1518 may be based on the configuration. In an example, 1902 may be performed by the power consumption component 199.

In one aspect, the signaling may indicate parameters of at least one of an energy harvesting phase of the device or an information transfer phase of the device. For example, the energy harvesting mode of the device may correspond to the WET phases 804, 808, 812 and the information transfer mode of the device may correspond to the WIT phases 806, 810, 814.

Figure 20:
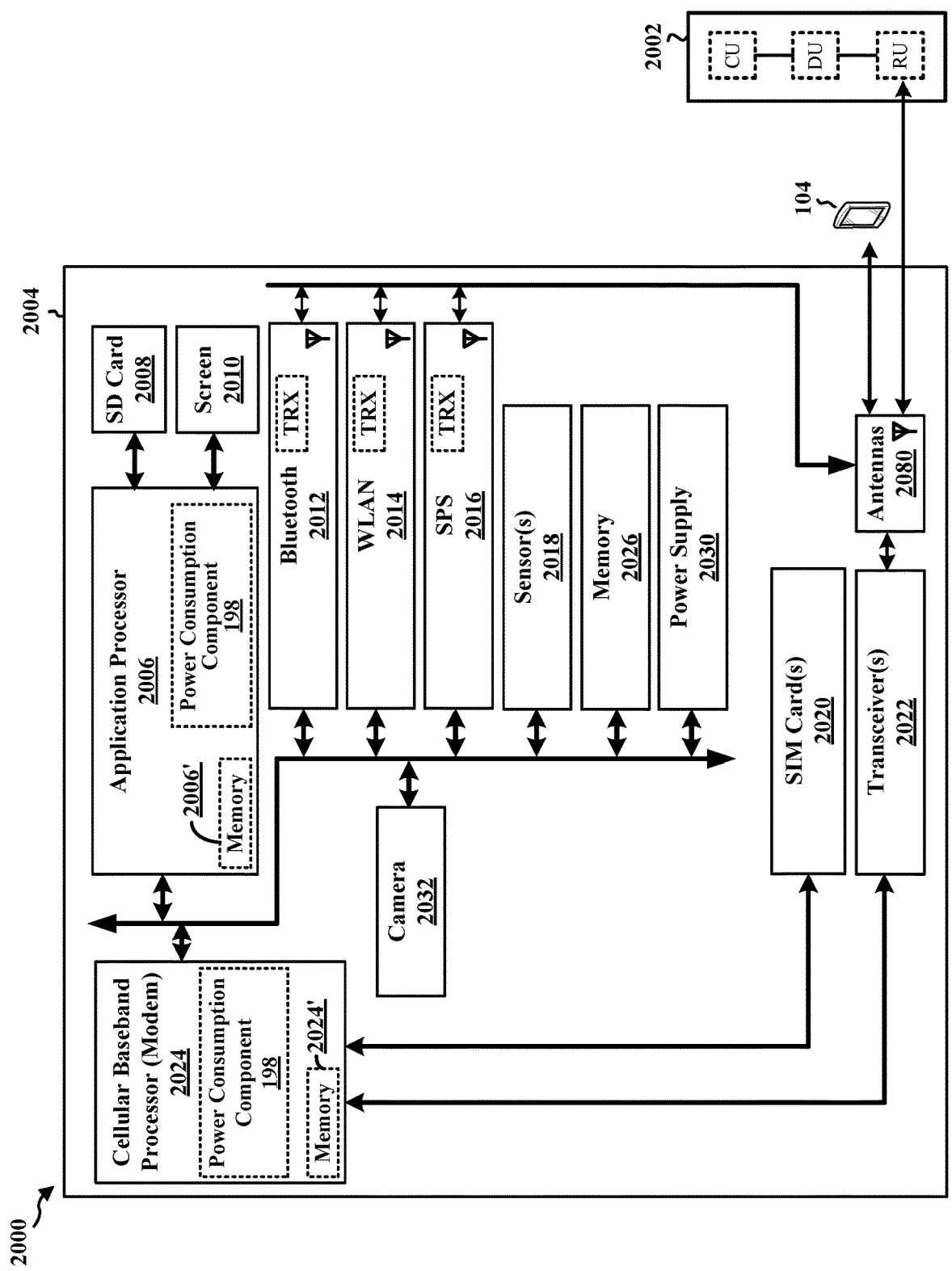
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include a cellular baseband processor 2024 (also referred to as a modem) coupled to one or more transceivers 2022 (e.g., cellular RF transceiver). The cellular baseband processor 2024 may include on-chip memory 2024'. In some aspects, the apparatus 2004 may further include one or more subscriber identity modules (SIM) cards 2020 and an application processor 2006 coupled to a secure digital (SD) card 2008 and a screen 2010. The application processor 2006 may include on-chip memory 2006'. In some aspects, the apparatus 2004 may further include a Bluetooth module 2012, a WLAN module 2014, an SPS module 2016 (e.g., GNSS module), one or more sensor modules 2018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the SPS module 2016 may include an on-chip transceiver (TRX)

(or in some cases, just a receiver (RX)). The Bluetooth module 2012, the WLAN module 2014, and the SPS module 2016 may include their own dedicated antennas and/or utilize the antennas 2080 for communication. The cellular baseband processor 2024 communicates through the transceiver(s) 2022 via one or more antennas 2080 with the UE 104 and/or with an RU associated with a network entity 2002. The cellular baseband processor 2024 and the application processor 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor 2024 and the application processor 2006 are each responsible for general processing, including the execution of software stored on the computer-readable medium/memory. The software, when executed by the cellular baseband processor 2024/application processor 2006, causes the cellular baseband processor 2024/application processor 2006 to perform the various functions described supra. The computer-readable medium/memory may also be used for storing data that is manipulated by the cellular baseband processor 2024/application processor 2006 when executing software. The cellular baseband processor 2024/application processor 2006 may be a component of the UE 350 and may include the memory 360 and/or at least one of the TX processor 368, the RX processor 356, and the controller/processor 359. In one configuration, the apparatus 2004 may be a processor chip (modem and/or application) and include just the cellular baseband processor 2024 and/or the application processor 2006, and in another configuration, the apparatus 2004 may be the entire UE (e.g., see 350 of FIG. 3) and include the additional modules of the apparatus 2004.

As discussed supra, the power consumption component 198 is configured to obtain, via at least one energy harvesting operation, energy from a wireless transmission. The power consumption component 198 is configured to transmit, for a network node, an indication of power consumption of the device for at least one of wireless communications or sensing at the device. The power consumption component 198 is configured to receive, prior to transmitting the indication of the power consumption of the device, a configuration for reporting the power consumption of the device, where the indication of the power consumption of the device is based on the configuration. The power consumption component 198 is configured to receive signaling based on the indication of the power consumption. The power consumption component 198 is configured to perform at least one of the wireless communications or the sensing based on the signaling. The power consumption component 198 may be within the cellular baseband processor 2024, the application processor 2006, or both the cellular baseband processor 2024 and the application processor 2006. The power consumption component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2004 may include a variety of components configured for various functions. In one configuration, the apparatus 2004, and in particular the cellular baseband processor 2024 and/or the application processor 2006, includes means for obtaining, via at least one energy harvesting operation, energy from a wireless transmission. In one configuration, the apparatus 2004, and in particular the cellular baseband processor 2024 and/or the application processor 2006, includes means for transmitting, for a network node, an indication of power consumption of the device for at least one of wireless communications or sensing at the device. In one configuration, the apparatus 2004, and in particular the cellular baseband processor 2024 and/or the application processor 2006, includes means for receiving, prior to transmitting the indication of the power consumption of the device, a configuration for reporting the power consumption of the device, where the indication of the power consumption of the device is based on the configuration. In one configuration, the apparatus 2004, and in particular the cellular baseband processor 2024 and/or the application processor 2006, includes means for receiving signaling based on the indication of the power consumption. In one configuration, the apparatus 2004, and in particular the cellular baseband processor 2024 and/or the application processor 2006, includes means for performing at least one of the wireless communications or the sensing based on the signaling. The means may be the power consumption component 198 of the apparatus 2004 configured to perform the functions recited by the means. As described supra, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 21:
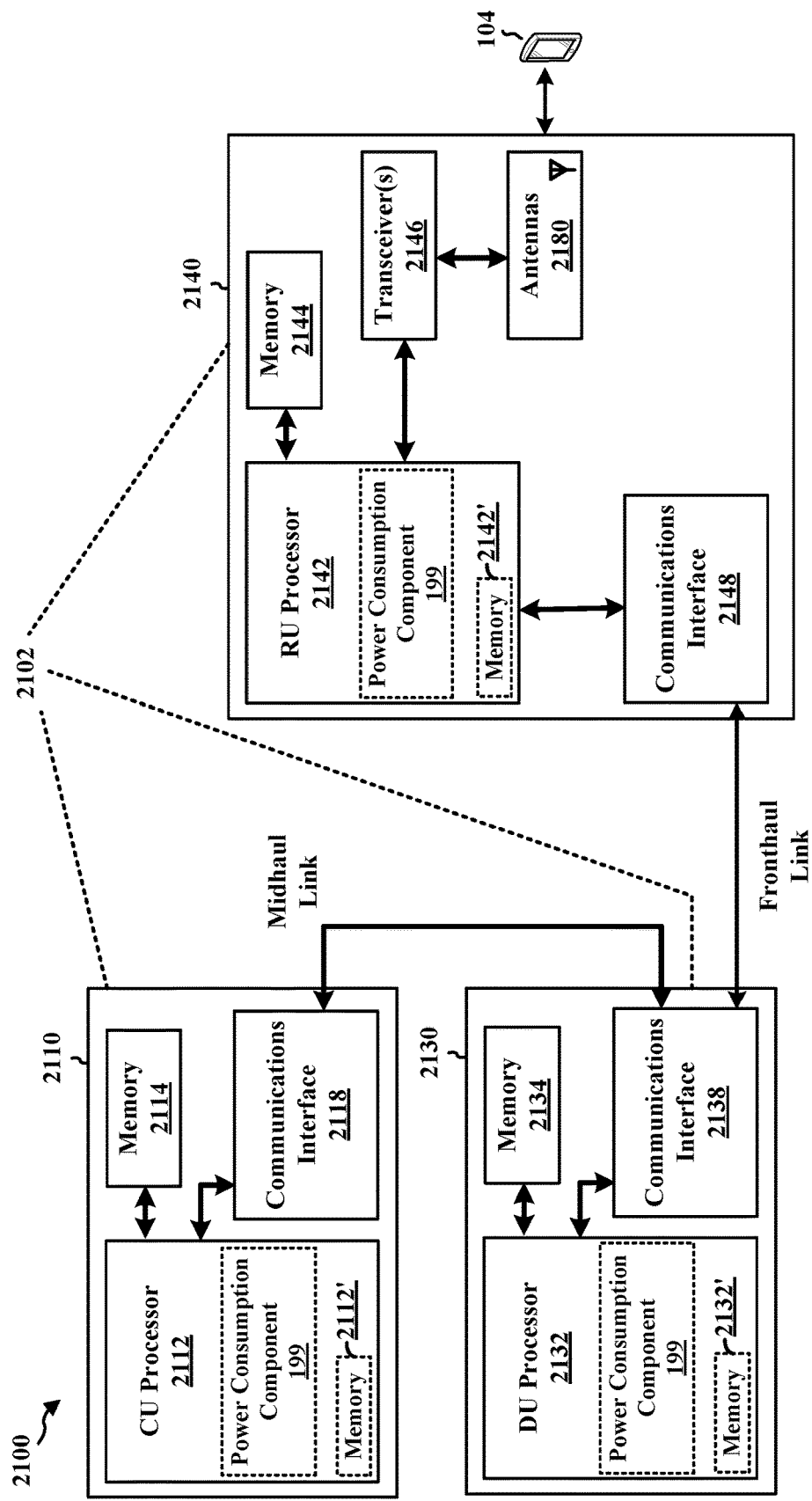
FIG. 21 is a diagram illustrating an example of a hardware implementation for an example network entity.

FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the power consumption component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, the CU 2110 may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, antennas 2180, and a communications interface 2148. The RU 2140 communicates with the UE 104. The on-chip memory 2112', 2132', 2142' and the additional memory modules 2114, 2134, 2144 may each be considered a computer-readable medium/memory. Each computer-readable medium/memory may be non-transitory. Each of the processors 2112, 2132, 2142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the power consumption component 199 is configured to receive an indication of power consumption of a device that supports energy harvesting for at least one of wireless communications or sensing based on energy harvested by at least one energy harvesting operation of the device. The power consumption component 199 is configured to transmit, based on the indication of the power consumption, signaling for the device associated with performing at least one of the wireless communications or the sensing. The power consumption component 199 is configured to transmit, prior to receiving the indication of the power consumption of the device, a configuration for reporting the power consumption of the device, where the indication of the power consumption of the device is based on the configuration. The power consumption component 199 may be within one or more processors of one or more of the CU 2110, DU 2130, and the RU 2140. The power consumption component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2102 may include a variety of components configured for various functions. In one configuration, the network entity 2102 includes means for receiving an indication of power consumption of a device that supports energy harvesting for at least one of wireless communications or sensing based on energy harvested by at least one energy harvesting operation of the device. The network entity 2102 may include a variety of components configured for various functions. In one configuration, the network entity 2102 includes means for transmitting, based on the indication of the power consumption, signaling for the device associated with performing at least one of the wireless communications or the sensing. The network entity 2102 may include a variety of components configured for various functions. In one configuration, the network entity 2102 includes means for transmitting, prior to receiving the indication of the power consumption of the device, a configuration for reporting the power consumption of the device, where the indication of the power consumption of the device is based on the configuration. The means may be the power consumption component 199 of the network entity 2102 configured to perform the functions recited by the means. As described supra, the network entity 2102 may include the TX processor 316, the RX processor 370, and the controller/processor 375. As such, in one configuration, the means may be the TX processor 316, the RX processor 370, and/or the controller/processor 375 configured to perform the functions recited by the means.

As noted above, a device (e.g., a UE) may include a EH harvesting modality (e.g., a backscatter radio). In an example, the device may receive an energy transfer signal from a network node. The device may harvest energy from the energy transfer signal to perform an operation during a communication phase with the network node or perform sensing via sensors of the device. The device may also store the energy in a battery. If the device lacks sufficient energy for the communication phase with the network node, the device may skip the communication phase. Similarly, if the device lacks sufficient energy to perform sensing, the device may not perform the sensing. Various technologies pertaining to a power consumption model for an energy harvesting device are disclosed herein. In an example, a device that supports energy harvesting obtains, via at least one energy harvesting operation, energy from a wireless transmission. The device transmits, for a network node, an indication of power consumption of the device for at least one of wireless communications or sensing at the device. The indication of the power consumption of the device may enable the network node to manage an energy transfer and duty cycle of a communication phase of the device in an energy efficient manner such that communications are not skipped due to the device lacking sufficient energy and/or such that the device does not skip sensing due to the device lacking sufficient energy.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a device that supports energy harvesting, including: obtaining, via at least one energy harvesting operation, energy from a wireless transmission; and transmitting, for a network node, an indication of power consumption of the device for at least one of wireless communications or sensing at the device.

Aspect 2 is the method of aspect 1, where the indication of the power consumption indicates at least one of: a backscatter radio power consumption for the device, a first power consumption based on polarization conversion, a second power consumption at a data rate, a third power consumption independent of the data rate, a fourth power consumption for processing downlink information, or a fifth power consumption for preparing a data transmission.

Aspect 3 is the method of aspect 2, where the indication of the power consumption is based on one or more of: at least one radio frequency component for the wireless communication, at least one modulator component of the device, a single pole double throw switch that supports at least one of ASK modulation or OOK modulation, or a pseudomorphic high electron mobility transistor that supports QAM.

Aspect 4 is the method of any of aspects 2-3, where the indication of the power consumption of the device includes a data-rate dependent power consumption.

Aspect 5 is the method of any of aspects 2-4, where the indication of the power consumption of the device is based on at least one of hardware of the device or a modulation scheme of the device.

Aspect 6 is the method of any of aspects 2-5, where the indication of the power consumption of the device includes a base power consumption of beamforming and the polarization conversion of the device independent of the data rate.

Aspect 7 is the method of any of aspects 1-6, where the device includes at least one active component including at least one modulator and at least one power amplifier, and where the indication of the power consumption of the device includes one or more of: first power consumption of the at least one modulator, a time for the at least one active component to be tuned in a steady state, a second power consumption of the at least one power amplifier, a preferred data rate for the wireless communications, or a preferred packet size of the wireless communications.

Aspect 8 is the method of aspect 7, where the indication of the power consumption of the device includes a plurality of categories of power consumptions and corresponding preferred data transmission schemes for each of the plurality of categories of the power consumptions.

Aspect 9 is the method of any of aspects 1-8, where the indication of the power consumption of the device indicates a multiple power consumptions for different types of radios at the device.

Aspect 10 is the method of aspect 9, where the indication of the power consumption of the device indicates a first power consumption of a backscatter radio and a second power consumption of an active radio.

Aspect 11 is the method of any of aspect 10, where the indication of the power consumption of the device indicates whether the backscatter radio or the active radio is to be used for the wireless communications, where the indication of the power consumption of the device is based on a prediction indicative of a stability of a source of the energy at a future time instance.

Aspect 12 is the method of any of aspects 1-11, where the sensing of the device includes one or more of: performing a temperature measurement, performing a humidity measurement, capturing an image, performing a RSSI measurement, performing a radar measurement, determining a velocity of the device, determining a location of the device, or determining an orientation of the device.

Aspect 13 is the method of any of aspects 1-12, where the indication of the power consumption of the device includes one or more of: a type of sensor that is to perform the sensing, a first power consumption of the sensor, a warm up time of the sensor, a time duration for which the sensor is to be active, or a processing time associated with the sensor.

Aspect 14 is the method of any of aspects 1-13, further including: receiving, prior to transmitting the indication of the power consumption of the device, a configuration for reporting the power consumption of the device, where the indication of the power consumption of the device is based on the configuration.

Aspect 15 is the method of any of aspects 1-14, further including: receiving signaling based on the indication of the power consumption; and performing at least one of the wireless communications or the sensing based on the signaling.

Aspect 16 is the method of aspect 15, where the signaling indicates parameters of at least one of an energy harvesting mode of the device or an information transfer mode of the device.

Aspect 17 is an apparatus for wireless communication at a device that supports energy harvesting including a memory and at least one processor coupled to the memory and based at least in part on information stored in the memory, the at least one processor is configured to perform a method in accordance with any of aspects 1-16.

Aspect 18 is an apparatus for wireless communications, including means for performing a method in accordance with any of aspects 1-16.

Aspect 19 is the apparatus of aspect 17 or 18 further including at least one of a transceiver or an antenna coupled to the at least one processor, where the at least one processor is configured to transmit the indication of the power consumption via at least one of the transceiver or the antenna.

Aspect 20 is a non-transitory computer-readable medium including instructions that, when executed by an apparatus, cause the apparatus to perform a method in accordance with any of aspects 1-16.

Aspect 21 is a method of wireless communication at a network node, including: receiving an indication of power consumption of a device that supports energy harvesting for at least one of wireless communications or sensing based on energy harvested by at least one energy harvesting operation of the device; and transmitting, based on the indication of the power consumption, signaling for the device associated with performing at least one of the wireless communications or the sensing.

Aspect 22 is the method of aspect 21, where the indication of the power consumption of the device includes one or more of: a first power consumption of at least one modulator of the device, a time for at least one active component of the device to be tuned in a steady state, a second power consumption of at least one power amplifier of the device, a preferred data rate for the wireless communications, or a preferred packet size of the wireless communications.

Aspect 23 is the method of aspect 22, where the indication of the power consumption of the device includes a data-rate dependent power consumption.

Aspect 24 is the method of any of aspects 22-23, where the indication of the power consumption of the device is based on at least one of hardware of the device or a modulation scheme of the device.

Aspect 25 is the method of any of aspects 22-24, where the indication of the power consumption of the device includes a base power consumption of beamforming and the polarization conversion of the device independent of the preferred data rate.

Aspect 26 is the method of any of aspects 21-25, where the indication of the power consumption of the device includes a plurality of categories of power consumptions and corresponding preferred data transmission schemes for each of the plurality of categories of the power consumptions.

Aspect 27 is the method of any of aspects 21-26, where the indication of the power consumption of the device includes a first power consumption of a backscatter radio of the device and a second power consumption of an active radio of the device.

Aspect 28 is the method of aspect 27, where the indication of the power consumption of the device indicates whether the backscatter radio or the active radio is to be used for the wireless communications, where the indication of the power consumption of the device is based on a prediction that is indicative of a stability of a source of the energy of the device at a future time instance.

Aspect 29 is the method of any of aspects 21-28, where the indication of the power consumption of the device includes one or more of: a type of sensor, a first power consumption of the sensor, a warm up time of the sensor, a time duration for which the sensor is to be active, or a processing time associated with the sensor.

Aspect 30 is the method of any of aspects 21-29, further including: transmitting, prior to receiving the indication of the power consumption of the device, a configuration for reporting the power consumption of the device, where the indication of the power consumption of the device is based on the configuration.

Aspect 31 is the method of any of aspects 21-30, where the signaling indicates parameters of at least one of an energy harvesting phase of the device or an information transfer phase of the device.

Aspect 32 is an apparatus for wireless communication at a network node including a memory and at least one processor coupled to the memory and based at least in part on information stored in the memory, the at least one processor is configured to perform a method in accordance with any of aspects 21-31.

Aspect 33 is an apparatus for wireless communications, including means for performing a method in accordance with any of aspects 21-31.

Aspect 34 is the apparatus of aspect 32 or 33 further including at least one of a transceiver or an antenna coupled to the at least one processor, where the at least one processor is configured to receive the indication of the power consumption and transmit the signaling for the device via at least one of the transceiver or the antenna.

Aspect 35 is a non-transitory computer-readable medium including instructions that, when executed by an apparatus, cause the apparatus to perform a method in accordance with any of aspects 21-31.

What is claimed is:

1. An apparatus for wireless communication at a device that supports energy harvesting, comprising:
    a memory; and
    at least one processor coupled to the memory and, based at least in part on information stored in the memory, the at least one processor is configured to:
        obtain, via at least one energy harvesting operation, energy from a wireless transmission; and
        transmit, for a network node, an indication of power consumption of the device for at least one of wireless communications or sensing at the device;
        receive signaling based on the indication of the power consumption; and
        perform at least one of the wireless communications or the sensing based on the signaling.

2. The apparatus of claim 1, wherein the indication of the power consumption indicates at least one of:
    a backscatter radio power consumption for the device,
    a first power consumption based on polarization conversion,
    a second power consumption at a data rate,
    a third power consumption independent of the data rate,
    a fourth power consumption for processing downlink information, or
    a fifth power consumption for preparing a data transmission.

3. The apparatus of claim 2, wherein the indication of the power consumption is based on one or more of:
    at least one radio frequency component for the wireless communication,
    at least one modulator component of the device,
    a single pole double throw switch that supports at least one of amplitude-shift keying (ASK) modulation or on-off keying (OOK) modulation, or
    a pseudomorphic high electron mobility transistor that supports quadrature amplitude modulation (QAM).

4. The apparatus of claim 2, wherein the indication of the power consumption of the device comprises a data-rate dependent power consumption.

5. The apparatus of claim 2, wherein the indication of the power consumption of the device is based on at least one of hardware of the device or a modulation scheme of the device.

6. The apparatus of claim 2, wherein the indication of the power consumption of the device comprises a base power consumption of beamforming and the polarization conversion of the device independent of the data rate.

7. The apparatus of claim 1, wherein the device further comprises at least one active component including at least one modulator and at least one power amplifier, and wherein the indication of the power consumption of the device comprises one or more of:
    a first power consumption of the at least one modulator,
    a time for the at least one active component to be tuned in a steady state,
    a second power consumption of the at least one power amplifier,
    a preferred data rate for the wireless communications, or
    a preferred packet size of the wireless communications.

8. The apparatus of claim 7, wherein the indication of the power consumption of the device comprises a plurality of categories of power consumptions and corresponding preferred data transmission schemes for each of the plurality of categories of the power consumptions.

9. The apparatus of claim 1, wherein the indication of the power consumption of the device indicates multiple power consumptions for different types of radios at the device.

10. The apparatus of claim 9, wherein the indication of the power consumption of the device indicates a first power consumption of a backscatter radio and a second power consumption of an active radio.

11. The apparatus of claim 10, wherein the indication of the power consumption of the device indicates whether the backscatter radio or the active radio is to be used for the wireless communications, wherein the indication of the power consumption of the device is based on a prediction indicative of a stability of a source of the energy at a future time instance.

12. The apparatus of claim 1, wherein the sensing of the device includes one or more of:
perform a temperature measurement, perform a humidity measurement, capture an image, perform a received signal strength indicator (RSSI) measurement, perform a radar measurement, determine a velocity of the device, determine a location of the device, or determine an orientation of the device.

13. The apparatus of claim 1, wherein the indication of the power consumption of the device comprises one or more of: a type of sensor that is to perform the sensing, a first power consumption of the sensor, a warm up time of the sensor, a time duration for which the sensor is to be active, or a processing time associated with the sensor.

14. The apparatus of claim 1, further comprising:
receive, prior to transmitting the indication of the power consumption of the device, a configuration for reporting the power consumption of the device, wherein the indication of the power consumption of the device is based on the configuration.

15. The apparatus of claim 1, wherein the signaling indicates parameters of at least one of an energy harvesting mode of the device or an information transfer mode of the device.

16. The apparatus of claim 1, further comprising: at least one of a transceiver or an antenna coupled to the at least one processor, wherein the at least one processor is configured to transmit the indication of the power consumption via at least one of the transceiver or the antenna.

17. A method of wireless communication at a device that supports energy harvesting, comprising:
obtaining, via at least one energy harvesting operation, energy from a wireless transmission; and
transmitting, for a network node, an indication of power consumption of the device for at least one of wireless communications or sensing at the device;
receiving signaling based on the indication of the power consumption; and
performing at least one of the wireless communications or the sensing based on the signaling.

18. An apparatus for wireless communication at a network node, comprising:
a memory; and
at least one processor coupled to the memory and, based at least in part on information stored in the memory, the at least one processor is configured to:
receive an indication of power consumption of a device that supports energy harvesting for at least one of wireless communications or sensing based on energy harvested by at least one energy harvesting operation of the device; and
transmit, based on the indication of the power consumption, signaling for the device associated with performing at least one of the wireless communications or the sensing;
wherein the signaling corresponds to at least one of an energy harvesting mode of the device or an information transfer mode of the device.

19. The apparatus of claim 18, wherein the indication of the power consumption of the device comprises one or more of:
a first power consumption of at least one modulator of the device,
a time for at least one active component of the device to be tuned in a steady state,
a second power consumption of at least one power amplifier of the device,
a preferred data rate for the wireless communications, or
a preferred packet size of the wireless communications.

20. The apparatus of claim 19, wherein the indication of the power consumption of the device comprises a data-rate dependent power consumption.

21. The apparatus of claim 19, wherein the indication of the power consumption of the device is based on at least one of hardware of the device or a modulation scheme of the device.

22. The apparatus of claim 19, wherein the indication of the power consumption of the device comprises a base power consumption of beamforming and a polarization conversion of the device independent of the preferred data rate.

23. The apparatus of claim 18, wherein the indication of the power consumption of the device comprises a plurality of categories of power consumptions and corresponding preferred data transmission schemes for each of the plurality of categories of the power consumptions.

24. The apparatus of claim 18, wherein the indication of the power consumption of the device comprises a first power consumption of a backscatter radio of the device and a second power consumption of an active radio of the device.

25. The apparatus of claim 24, wherein the indication of the power consumption of the device indicates whether the backscatter radio or the active radio is to be used for the wireless communications, wherein the indication of the power consumption of the device is based on a prediction that is indicative of a stability of a source of the energy of the device at a future time instance.

26. The apparatus of claim 18, wherein the indication of the power consumption of the device comprises one or more of: a type of sensor, a first power consumption of the sensor, a warm up time of the sensor, a time duration for which the sensor is to be active, or a processing time associated with the sensor.

27. The apparatus of claim 18, further comprising:
transmit, prior to receiving the indication of the power consumption of the device, a configuration for reporting the power consumption of the device, wherein the indication of the power consumption of the device is based on the configuration.

28. The apparatus of claim 18, further comprising: at least one of a transceiver or an antenna coupled to the at least one processor, wherein the at least one processor is configured to receive the indication of the power consumption and transmit the signaling via at least one of the transceiver or the antenna.

29. A method of wireless communication at a network node, comprising:
- receiving an indication of power consumption of a device that supports energy harvesting for at least one of wireless communications or sensing based on energy harvested by at least one energy harvesting operation of the device; and
- transmitting, based on the indication of the power consumption, signaling for the device associated with performing at least one of the wireless communications or the sensing;
- wherein the signaling corresponds to at least one of an energy harvesting mode of the device or an information transfer mode of the device.

* * * * *